US011249565B2

(12) United States Patent
Xu et al.

(10) Patent No.: US 11,249,565 B2
(45) Date of Patent: Feb. 15, 2022

(54) TOUCH INPUT TOOL AND SYSTEM

(71) Applicants: Qiang Xu, Thornhill (CA); Junwei Sun, Markham (CA); Jun Li, Markham (CA); Chenhe Li, Markham (CA); Wei Li, Markham (CA); Gaganpreet Singh, Markham (CA)

(72) Inventors: Qiang Xu, Thornhill (CA); Junwei Sun, Markham (CA); Jun Li, Markham (CA); Chenhe Li, Markham (CA); Wei Li, Markham (CA); Gaganpreet Singh, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/867,230

(22) Filed: May 5, 2020

(65) Prior Publication Data

US 2021/0349555 A1 Nov. 11, 2021

(51) Int. Cl.
*G06F 3/0354* (2013.01)
*G06F 3/044* (2006.01)
*G06K 9/00* (2022.01)

(52) U.S. Cl.
CPC .......... *G06F 3/03545* (2013.01); *G06F 3/044* (2013.01); *G06K 9/00335* (2013.01)

(58) Field of Classification Search
CPC .... A63F 13/214; A63F 13/24; A63F 13/2145; A63F 13/426; A63F 13/79; A63F 13/80; A63F 3/00; A63F 3/00643; A63F 3/00697; A63F 2003/00662; A63F 2003/00725; A63F 2003/00845; A63F 2003/00996; A63F 2009/241; A63F 2009/2442; A63F 2009/2458; A63F 2009/2486; A63F 3/02; G06F 3/014; G06F 3/017; G06F 3/03547; G06F 3/044; G06F 2203/0339; G06F 2203/04103; G06F 2203/04809; G06F 1/1662; G06F 1/1669; G06F 3/0202; G06F 3/0219; G06F 3/0227; G06F 3/041;

(Continued)

(56) References Cited

U.S. PATENT DOCUMENTS

2015/0220178 A1 8/2015 Zeliff et al.
2015/0242000 A1 8/2015 Dowd et al.
(Continued)

FOREIGN PATENT DOCUMENTS

CN 201122278 Y 9/2008
CN 101464847 A 6/2009
(Continued)

OTHER PUBLICATIONS

Lopes, P., Mendes, D., Araújo, B. and Jorge, J.A., Aug. 2011, Combining bimanual manipulation and pen-based input for 3D modelling. In Proceedings of the Eighth Eurographics Symposium on Sketch-Based Interfaces and Modeling (pp. 15-22). ACM.

(Continued)

*Primary Examiner* — Nelson M Rosario

(57) ABSTRACT

A touch input tool for interacting with a capacitive touch-screen display. The touch input tool includes a plurality of spaced apart conductive touchscreen touch elements arranged to simultaneously operatively engage a screen of the touchscreen display at a corresponding plurality of discrete respective touch locations.

14 Claims, 18 Drawing Sheets

(58) Field of Classification Search
CPC ........ G06F 3/0488; G06F 1/162; G06F 1/169; G06F 1/1692; G06F 3/03543; G06F 3/03545; G06F 3/04886; G06F 2203/0333; G06F 2203/0335; G06F 3/0383; G06F 2203/04105; G06K 9/00355; H03K 17/962

See application file for complete search history.

(56) References Cited

U.S. PATENT DOCUMENTS

| | | | | |
|---|---|---|---|---|
| 2018/0074639 | A1* | 3/2018 | Powell | G06F 3/04847 |
| 2020/0159319 | A1* | 5/2020 | Lin | G06F 3/03547 |
| 2020/0285328 | A1* | 9/2020 | Usui | G06F 3/03547 |
| 2020/0371680 | A1* | 11/2020 | Barel | G06F 3/0441 |

FOREIGN PATENT DOCUMENTS

| | | |
|---|---|---|
| CN | 108491117 A | 9/2018 |
| CN | 109885189 A | 6/2019 |

OTHER PUBLICATIONS

Pfeuffer, K., Hinckley, K., Pahud, M. and Buxton, B., May 2017, Thumb+ Pen Interaction on Tablets. In Proceedings of the 2017 CHI Conference on Human Factors in Computing Systems (pp. 3254-3266). ACM.

Romat, H., Henry Riche, N., Hinckley, K., Lee, B., Appert, C., Pietriga, E. and Collins, C., Apr. 2019, Activeink:(th) inking with data. In Proceedings of the 2019 CHI Conference on Human Factors in Computing Systems (p. 42). ACM.

Walker, G., 2012. A review of technologies for sensing contact location on the surface of a display. Journal of the Society for Information Display, 20(8), pp. 413-440.

Zhang, Y., Pahud, M., Holz, C., Xia, H., Laput, G., McGuffin, M., Tu, X., Mittereder, A., Su, F., Buxton, W. and Hinckley, K., Apr. 2019, Sensing Posture-Aware Pen+ Touch Interaction on Tablets. In Proceedings of the 2019 CHI Conference on Human Factors in Computing Systems (p. 55). ACM.

Fellion, Nicholas, Alexander Keith Eady, and Audrey Girouard. "Flexstylus: A deformable stylus for digital art." Proceedings of the 2016 CHI Conference Extended Abstracts on Human Factors in Computing Systems. ACM, 2016.

Grossman, T., Hinckley, K., Baudisch, P., Agrawala, M. and Balakrishnan, R., Apr. 2006, Hover widgets: using the tracking state to extend the capabilities of pen-operated devices. In Proceedings of the SIGCHI conference on Human Factors in computing systems (pp. 861-870).

Hinckley, K., Yatani, K., Pahud, M., Coddington, N., Rodenhouse, J., Wilson, A., Benko, H. and Buxton, B., Oct. 2010, Pen+ touch= new tools. In Proceedings of the 23nd Annual ACM Symposium on User Interface Software and Technology (pp. 27-36). ACM.

Song, H., Benko, H., Guimbretiere, F., Izadi, S., Cao, X. and Hinckley, K., May 2011, Grips and gestures on a multi-touch pen. In Proceedings of the SIGCHI Conference on Human Factors in Computing Systems (pp. 1323-1332).

Vogel, D. and Casiez, G., Oct. 2011, Conté: multimodal input inspired by an artist's crayon. In Proceedings of the 24th Annual ACM Symposium on User Interface Software and Technology (pp. 357-366). ACM.

Vogel, D. and Balakrishnan, R., 2010. Direct pen interaction with a conventional graphical user interface. Human-Computer Interaction, 25(4), pp. 324-388.

Xin, Y., Bi, X. and Ren, X., May 2011, Acquiring and pointing: an empirical study of pen-tilt-based interaction. In Proceedings of the SIGCHI Conference on Human Factors in Computing Systems (pp. 849-858).

* cited by examiner

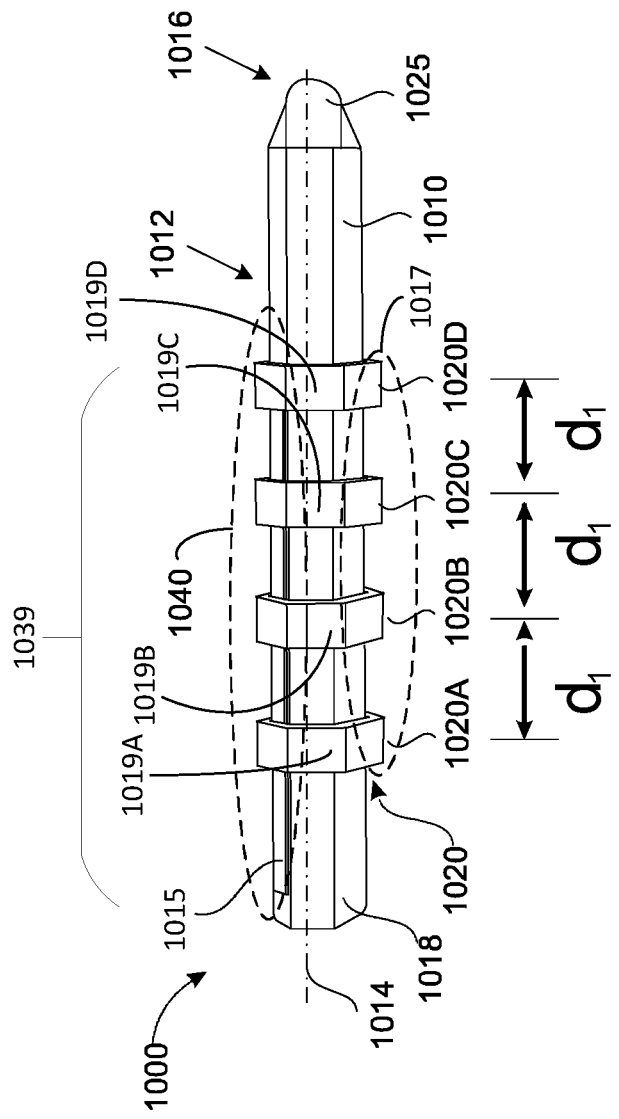

TOUCH INPUT TOOL AND SYSTEM

FIELD

This disclosure relates generally to a touch input tool for touchscreen displays and more specifically to a touch input tool that can generate multiple input gestures.

BACKGROUND

Electronic devices often have touchscreen displays to enable user interaction with the device. Users can input information through simple or multi-touch gestures by touching the touchscreen display with an input device such as a pen-style stylus or with one or more fingers. The large size and advanced hardware specifications of touchscreen displays has enabled touchscreen devices to become important tools for productivity.

A common way for a user to interact with a touchscreen display is to through touch gestures using fingers or the end (tip) of a pen-style stylus. By way of example, gestures and their corresponding descriptions that can be recognized by the Microsoft Surface™ operating system based on finger-based touch events include: "Tap: Press and then release"; "Slide or Push: Move a displayed object under finger with a sliding or pushing action: "Flick: Press, slide quickly, and then release"; "Touch-and-turn: Slide finger on the content around a point of the content"; "Spin: Twist quickly to rotate the object"; "Pull apart Stretch: Pull fingers apart on two hands"; "Push together Shrink: Bring fingers together on two hands"; "Twist: Twist the object with two or more fingers, like turning a knob or paper"; "Pinch: Bring two fingers together on one hand"; "Squeeze: Bring three or more fingers together on one hand"; "Spread: Pull fingers apart on one hand" and "Pin turn: Pin the object in place with one finger while the other finger drags the object around the pinned point".

As evidenced from the above list, other than basic tap and drag gestures that can be performed using a stylus tip, most touchscreen interactions require finger based gestures, with the result that users who want to use a stylus often have to switch to finger gestures to take advantage of advanced touch screen capability.

Pen-type styluses have been widely used as touch input tools on electronic devices with touchscreen displays. A stylus typically has a shaft and a tip. Most of the research related to styluses has been either focused on the accuracy of handwriting, or methods of interactions with touchscreen displays via the pen tip.

Some touch input tools have been developed that enable non-tip portions of a stylus to be used to provide user inputs. One existing touch input tool has a bendable stylus that employs embedded sensors to measure the extent and angle of flexion of its shaft via fiber optic sensing. Another existing touch input tool interacts with electric field sensors embedded around a screen bezel for proximity detection such that placement of the stylus on the screen is detected by the electric field sensors, triggering a smart menu display.

The aforementioned devices provide limited input functionality, are costly, and need computational resources in the form of custom hardware drivers. Accordingly, there is a need for a tool shaft touchscreen interaction solution that is one or more of: cost efficient to manufacture and implement, usable with existing touchscreen drivers, and allows a tool shaft to be used for a range of different tool shaft input gestures.

SUMMARY

According to an aspect of the present disclosure, there is provided a touch input tool is disclosed for interacting with a capacitive touchscreen display. The touch input tool includes a plurality of spaced apart conductive touchscreen touch elements arranged to simultaneously operatively engage a screen of the touchscreen display at a corresponding plurality of discrete respective touch locations.

In the preceding aspect, the touch input tool can enable an enhanced set of input gestures relative to those that can be provided using a traditional touch input tool such as a capacitive tipped stylus. This may improve user experience with a touchscreen enabled device, and in some examples may allow a user to provide a greater range of user inputs with fewer user interactions with the display screen, which in some applications may improve lifespan of a touchscreen display, improve device performance, and/or reduce power consumption, among other things.

In at least some of the preceding aspects, the touch input tool includes a first conductive structure that includes a human contact interface and the touchscreen touch elements. The human contact interface and touchscreen touch elements are configured so that a conductive path is provided from each of the touchscreen touch elements to the human contact interface enabling the touchscreen touch elements to simultaneously operatively engage the screen at the respective touch locations when the human contact interface is in conductive contact with a human and the touchscreen touch elements touch the screen.

In at least some of the preceding aspects, the touch input tool is a stylus and the touchscreen touch elements are arranged along a shaft of the stylus.

In at least some examples of the preceding aspects, the first conductive structure includes three of the touchscreen touch elements arranged to provide a touchscreen touch pattern that indicates a direction of the touch input tool with respect to the touchscreen display when the three touchscreen touch elements operatively engage the screen.

In at least some of the preceding aspects, the three touchscreen touch elements are arranged along an axis of the touch input tool, a middle of the three touchscreen touch elements being located asymmetrically between the other two of the three touchscreen touch elements.

In at least some of the preceding aspects, at least one of the touchscreen touch elements is configured to provide a different touch element pattern than at least one other of the touchscreen touch elements.

In at least some of the preceding aspects, the touch input tool includes a second conductive structure that is electrically isolated from the first conductive structure and includes a respective touch screen touch element to operatively engage the screen at a respective touch location and a respective human contact interface that is arranged relative to the human contact interface of the first conductive structure to enable both of the human contact interfaces to be simultaneously contacted by a same hand of a user.

In at least some of the preceding aspects, the touch input tool includes a third conductive structure that is electrically isolated from the first conductive structure and the second conductive structure, the third conductive structure including a respective touch screen touch element to operatively engage the screen at a respective touch location and a respective human contact interface that is arranged relative to the human contact interface of the first conductive structure to enable both of the human contact interfaces to be simultaneously contacted by a same hand of a user.

In at least some of the preceding aspects, the touch screen elements of the first second and third conductive structures are arranged along a shaft of the touch input tool to simultaneously contact the screen when the touch input tool is placed on the screen, and the human contact interfaces are arranged along the shaft.

In at least some of the preceding aspects, the spaced apart conductive touchscreen touch elements are each defined by a respective conductive ring structure that is located on a shaft of the touch input tool.

In at least some of the preceding aspects, the touch input tool comprises a housing defining an axially extending internal passage and a conductive body extending within the internal passage, the plurality of spaced apart conductive touchscreen elements extending from the conductive body through respective openings defined along a side of by the housing. In some examples, the touch input tool includes a conductive touch tip at an end of the conductive body, the touch tip being electrically connected to the conductive body.

In at least some of the preceding aspects, the touch input tool includes a further plurality of spaced apart conductive touchscreen touch elements extending from the conductive body through respective openings defined along a further side of the housing, the further plurality of spaced apart conductive touchscreen touch elements being arranged to simultaneously operatively engage the screen of the touchscreen display, the further plurality of spaced apart conductive touchscreen touch elements having a different pattern than the plurality of touchscreen elements.

In at least some of the preceding aspects, the touch input tool includes only passive electrical components for effecting operative engagement of the screen by the touchscreen touch elements.

According to another aspect of the present disclosure, there is provided a system comprising the touch input tool of the preceding aspects and an electronic device comprising a touchscreen display, the electronic device being configured to sense a touch event on the touchscreen display and determine if the touch event matches a touch input tool gesture pattern that corresponds to the plurality of touchscreen touch elements simultaneously operatively engaging the touchscreen display.

In the preceding aspect, the plurality of touchscreen touch elements are electrically connected to a first human contact interface, and the touch input tool comprises a further touchscreen touch element and second human contact interface that are electrically connected to each other and electrically isolated from the first human contact interface, the electronic device being configured to determine that a button click input has occurred if a further touch event on the touchscreen display matches a touch input tool gesture pattern that corresponds to the further touchscreen touch element operatively engaging the touchscreen display.

According to another aspect of the present disclosure, there is a method that includes receiving a plurality of signals from a touch sensing system of a capacitive touchscreen display of an electronic device, the signals indicating relative touch locations corresponding to a touch event on the touchscreen display; and determining if the touch locations for the touch event match a touch pattern that corresponds to simultaneous operative engagement of the touchscreen display placement of by a plurality of spaced apart touchscreen touch elements of a touch input tool on the touchscreen display.

In accordance with the preceding aspect, the method further includes causing the electronic device to perform a predetermined action if the touch locations for the touch event match the touch pattern.

According to a still another aspect of the present disclosure, there is provided a method that includes receiving signals from the touch sensing system indicating relative touch locations corresponding to a further touch event on the touchscreen display; and determining that a click input has occurred if the touch location for the further touch event match a touch pattern that corresponds to placement operative engagement of the touchscreen display by a of a further touchscreen touch element of the touch input tool on the touchscreen display.

In accordance with the preceding, the method further includes determining an orientation of the touch input tool based on the touch locations for the touch event.

BRIEF DESCRIPTION OF THE DRAWINGS

Reference will now be made, by way of example, to the accompanying drawings which show example embodiments of the present application, and in which:

FIG. 3 is a perspective view of a touch input tool having a rigid body supporting a plurality of spaced apart conductive touchscreen touch elements, in accordance with embodiments of the present disclosure;

DESCRIPTION OF EXAMPLE EMBODIMENTS

In this disclosure the term "electronic device" refers to an electronic device having computing capabilities. Examples of electronic devices include but are not limited to: personal computers, laptop computers, tablet computers ("tablets"), smartphones, surface computers, augmented reality gear, automated teller machines (ATM)s, point of sale (POS) terminals, and the like.

In this disclosure, the term "display" refers to a hardware component of an electronic device that has a function of displaying graphical images, text, and video content thereon. Non-limiting examples of displays include liquid crystal displays (LCDs), light-emitting diode (LED) displays, and plasma displays.

In this disclosure, a "screen" refers to the outer user-facing layer of a touchscreen display.

In this disclosure, the term "touchscreen display" refers to a combination of a display together with a touch sensing system that is capable of acting as an input device by receiving touch input. Non-limiting examples of touchscreen displays are: capacitive touchscreens, resistive touchscreens, and Infrared touchscreens and surface acoustic wave touchscreens.

In this disclosure, the term "touchscreen-enabled device" refers to an electronic device equipped with a touchscreen display.

Figure 1A:
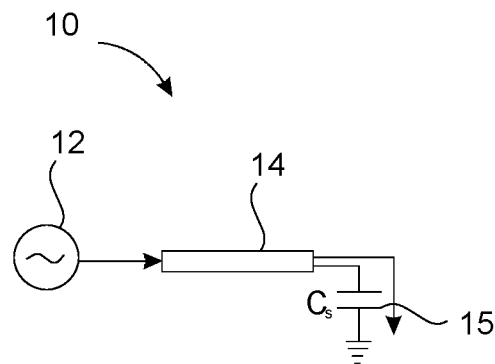
FIG. 1A is a simplified prior art circuit diagram of a touch sensing subsystem that employs a self-capacitance measurement mechanism.
Figure 1B:
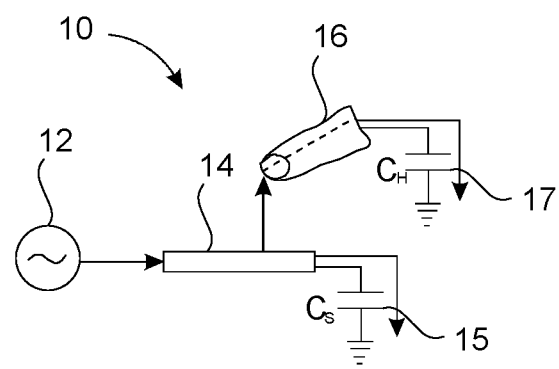
FIG. 1B is a simplified prior art circuit diagram of the touch sensing subsystem of FIG. 1A showing a human finger engaging the mechanism.

In this disclosure, the term "touch event" refers to an event during which a physical object is detected as interacting with the screen of a touchscreen display. FIGS. 1A and 1B depict a simplified prior art circuit diagram of a sensing element of a touchscreen sensing subsystem 10 that employs a self-capacitance measurement mechanism. In the shown system, a signal source 12 runs a current i across the screen region 14 of the screen of a touchscreen display. The capacitance 15 of the screen region 14 of the screen with respect to the ground can be measured by a sensor (not shown) as $C_S$. When a conductive object, such as a human finger 16, touches the screen region 14, the human finger 16 acts as another capacitor having a capacitance $C_H$ between the screen region 14 and the ground 18. The equivalent capacitance of the screen region 14 in this case is the sum of the original screen capacitance $C_H$ and the capacitance of the human finger $C_H$ since the two capacitances are connected in parallel. Accordingly, the equivalent is $C_S+C_H$ and can be measured by the sensor. The difference in capacitance between the two cases serves as an indication that the screen region 14 has been touched by a human finger 16 or another conductive object, such as a touch input tool. The touchscreen display comprises an array of screen regions 14. Accordingly, a touch sensing system operatively connected with the touchscreen display can detect the occurrence and location of a touch event on the screen based on the difference in the self-capacitance at respective screen regions 14.

Figure 2A:
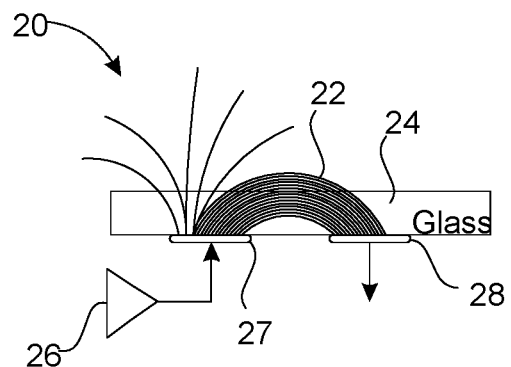
FIG. 2A is a simplified prior art circuit diagram of a touch sensing subsystem that employs a mutual capacitance measurement mechanism.
Figure 2B:
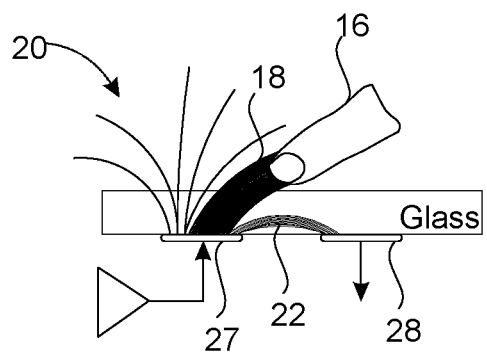
FIG. 2B is a simplified prior art circuit diagram of the touch sensing subsystem of FIG. 2A showing a human finger engaging the subsystem.

FIGS. 2A and 2B depict a simplified prior art circuit diagram of a touchscreen sensing subsystem 20 that employs mutual capacitance. In the shown subsystem, a charge source 26 provide charges to a drive electrode 27. Proximate to the drive electrode 27 is a sense electrode 28. The drive and sense electrodes are positioned under a glass region 24 of the screen of a capacitive touchscreen display. The drive electrode 27 projects an electric field 22 towards the sense electrode 28 which can be sensed by a sensor (not shown) connected to the sense electrode 28. When a human finger 16 touches the glass 24, a portion of the electric field 22 is diverted to the human finger 16 as a second electric field 18. As a result, the first electric field 22 between the drive electrode and the sense electrode 28 is reduced in strength. Accordingly, the sensor detects a reduced electric field at the sense electrode 28 thus indicating that the screen region 14 of the screen is being been touched by a human finger or another object such as a touch input tool.

According to embodiments of the present disclosure, a touch input tool for interacting with a capacitive touchscreen display is provided. The touch input tool is configured to simultaneously interact with the screen of a touchscreen display and a user to generate one or more screen touch events. The touch input tool has a rigid body supporting a plurality of spaced apart conductive touchscreen touch elements fixed at discrete locations relative to each other. FIG. 3 illustrates a touch input tool 1000 according to an example embodiment. Touch input tool 1000 takes the form of a pen-shaped stylus, having a rigid body 1012 that extends along an elongate axis 1014 from a first axial end 1016 to a second axial end 1018. The rigid body 1012 includes an elongate shaft 1010 that extends along elongate axis 1014 and is located between the first end 1016 and second end 1018 of the body 1012. In example embodiments, the shaft 1010 is configured to allow a user to grip the stylus and is cylindrical or cuboid shaped along its length. Touch input tool 1000 may have a tapered tip 1025 provided at one or more of the axial ends 1016, 1018 of the body 1012. The tip 1025 may be used to actuate user-interface elements on a touchscreen display. In some examples, touch input tool 1000 may also incorporate a writing pen. For example, touch input tool 1000 may have an ink-dispensing writing tip at an opposite end than the tip 1025.

In the example embodiment of FIG. 3, the touch input tool 1000 includes a conductive structure 1039 supported along a shaft 1010. Conductive structure 1039 includes a conductive human contact interface, indicated generally by dashed ellipse 1040, and a screen interface, indicated generally by dashed ellipse 1017. The conductive human contact interface 1040 and screen interface 1017 may for example be located along opposite sides of the shaft 1010. In the example of FIG. 3 the conductive structure 1039 is formed from a plurality of conductive ring structures 1019A, 1019B, 1019C, 1019D (e.g., 4 in the example of FIG. 3), that are disposed at fixed distances relative to each other along a length of shaft 1010. Conductive structure 1039 also includes an elongate conductive element 1015 that extends along a length of the shaft 1010 to electrically connect conductive ring structures 1019A, 1019B, 1019C, 1019D. In the example of FIG. 3, elongate conductive element 1015 extends beyond electrically connect conductive ring structures 1019A, 1019B, 1019C, 1019D at one portion of shaft 1010, providing additional surface area for human contact. Each of the conductive ring structures 1019A, 1019B, 1019C and 1019D defines a respective touchscreen touch element 1020A, 1020B, 1020C and 1020D (collectively touch elements 1020). The touch elements 1020 collectively form the screen interface 1017 and are configured to operatively engage the screen of a touchscreen display at respective discrete locations. As shown in the illustrated example of FIG. 3, the touch elements are uniformly spaced with respect to each other. (i.e., spacing between touch elements 1020A and 1020B is "$d_1$", spacing between touch elements 1020B and 1020C is also "$d_1$", and spacing between touch elements 1020C and 1020D is also "$d_1$".

In the example of FIG. 3, the human contact interface 1040 is collectively provided by the elongate strip 1015 and the regions of the conductive ring structures 1019A, 1019B, 1019C and 1019D that are generally located along the opposite side of the shaft 1010 than the regions that define touchscreen touch elements 1020A, 1020B, 1020C and 1020D. Accordingly, the conductive structure 1039 provides: four discrete touchscreen touch elements 1020A, 1020B, 1020C and 1020D that can each operatively engage a screen of a touchscreen display at a respective discrete touch location; a human contact interface 1040 that can be engaged by a user; and conductive paths between the human contact interface 1040 and the discrete touchscreen touch elements 1020A, 1020B, 1020C. In some examples, touch input tool tip 1025 may be electrically connected to human contact interface 1040, enabling the tip 1025 to be used to provide touch input independently of the discrete touchscreen touch elements 1020A, 1020B, 1020C, 1020D.

In the example of FIG. 3, one human contact interface 1040 is electrically connected to all of the touchscreen touch elements 1020 to effect a detectable tool touch event with a touchscreen display when the touch input tool 1000 is placed on the screen of the touchscreen display. In example embodiments, the touch input tool 1000 is a passive device in that it does not have an internal power source and does not include any active electrical elements. It functions based merely on conductive structures that include touch elements that can discreetly engage a touchscreen display to generate a recognizable touch pattern. Touch input tool 1000 may take a number of configurations other than that shown in FIG. 3 and a number of alternative examples will be described below.

Figure 4A:
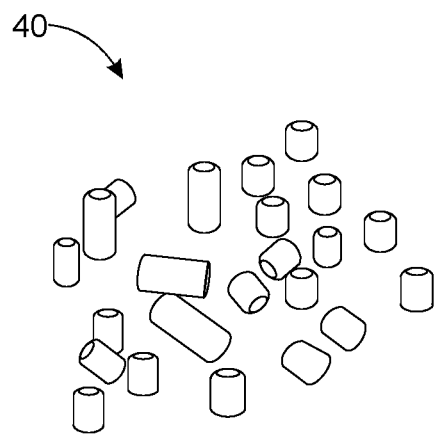
FIG. 4A depicts conductive rubber structures which may be cut and shaped to make touchscreen touch elements for a touch input tool.
Figure 4B:
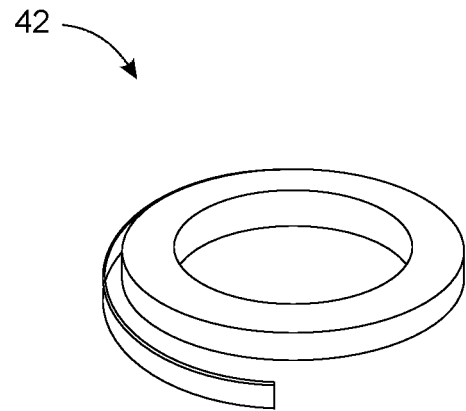
FIG. 4B depicts a copper tape which may be cut and adhered to the rigid body of a touch input tool to form touchscreen touch elements thereon.
Figure 4C:
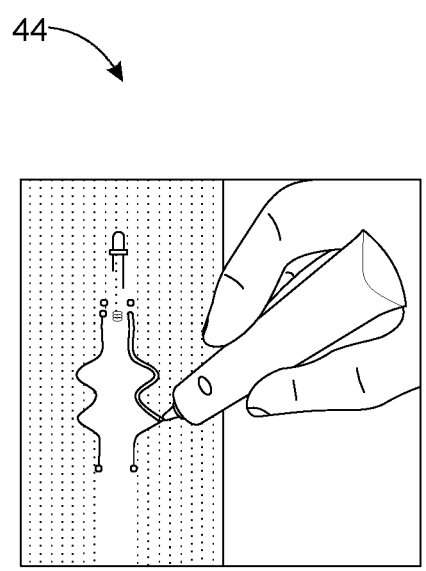
FIG. 4C depicts electric paint which may be used to draw touchscreen touch elements on the rigid body of a touch input tool.
Figure 4D:
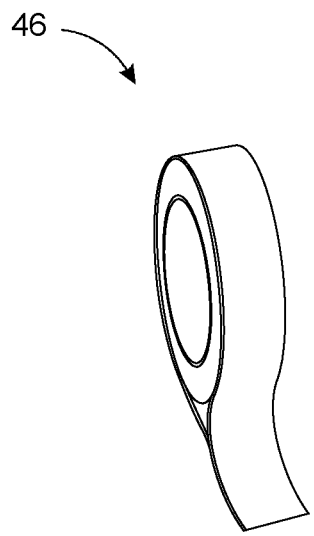
FIG. 4D depicts a perspective view of a roll of foil tape which may be used to provide touchscreen touch elements on the rigid body of a touch input tool.

FIGS. 4A-4D depict a number of conductive materials that may be used to make the conductive structure 1039. FIG. 4A depicts conductive rubber structures 40 which may be cut and shaped to make the ring structures 1019A, 1019B, 1019C and 1019D that define touch elements 1020 and are mounted at discrete locations on the rigid body 1012 of the touch input tool 1000. FIG. 4B shows copper tape 42, which may be cut and adhered at discrete locations to the rigid body 1012 of the touch input tool 1000 to form the ring structures 1019A, 1019B, 1019C and 1019D thereon. In one embodiment, the copper tape 42 comprises multilayer conductive copper tape. FIG. 4C depicts electrically conductive paint 44 which may be used to draw the ring structures 1019A, 1019B, 1019C and 1019 at discrete locations on the rigid body 1012 of the touch input tool 1000. FIG. 4D depicts foil tape 46 which may be adhered to the rigid body 1012 of the touch input tool 1000 at discrete locations to form the ring structures 1019A, 1019B, 1019C and 1019D thereon. Conductive tapes other than copper and foil can also be used in various examples. Elongate conductive element 1015 may also be formed from one or more of conductive rubber, conductive tape (e.g. copper or foil), conductive paint, or other conductive element secured to or supported within the rigid body 1012.

In example embodiments, an electronic device 100 is configured to enable the touch elements 1020 of touch input tool 1000 to provide touch input to touchscreen display 45. In this regard, in FIGS. 5A and 5B each illustrate examples in which the touch input tool 1000 is placed on a portion of the touchscreen display 45 such that the elongate axis 1014 of shaft 1010 is parallel to a viewing surface of the screen 48 of touchscreen display 45. The plurality of touch elements 1020 that are spaced apart along the shaft 1010 simultaneously and discretely operatively engage screen 48 of touchscreen display 45.

Figure 6:
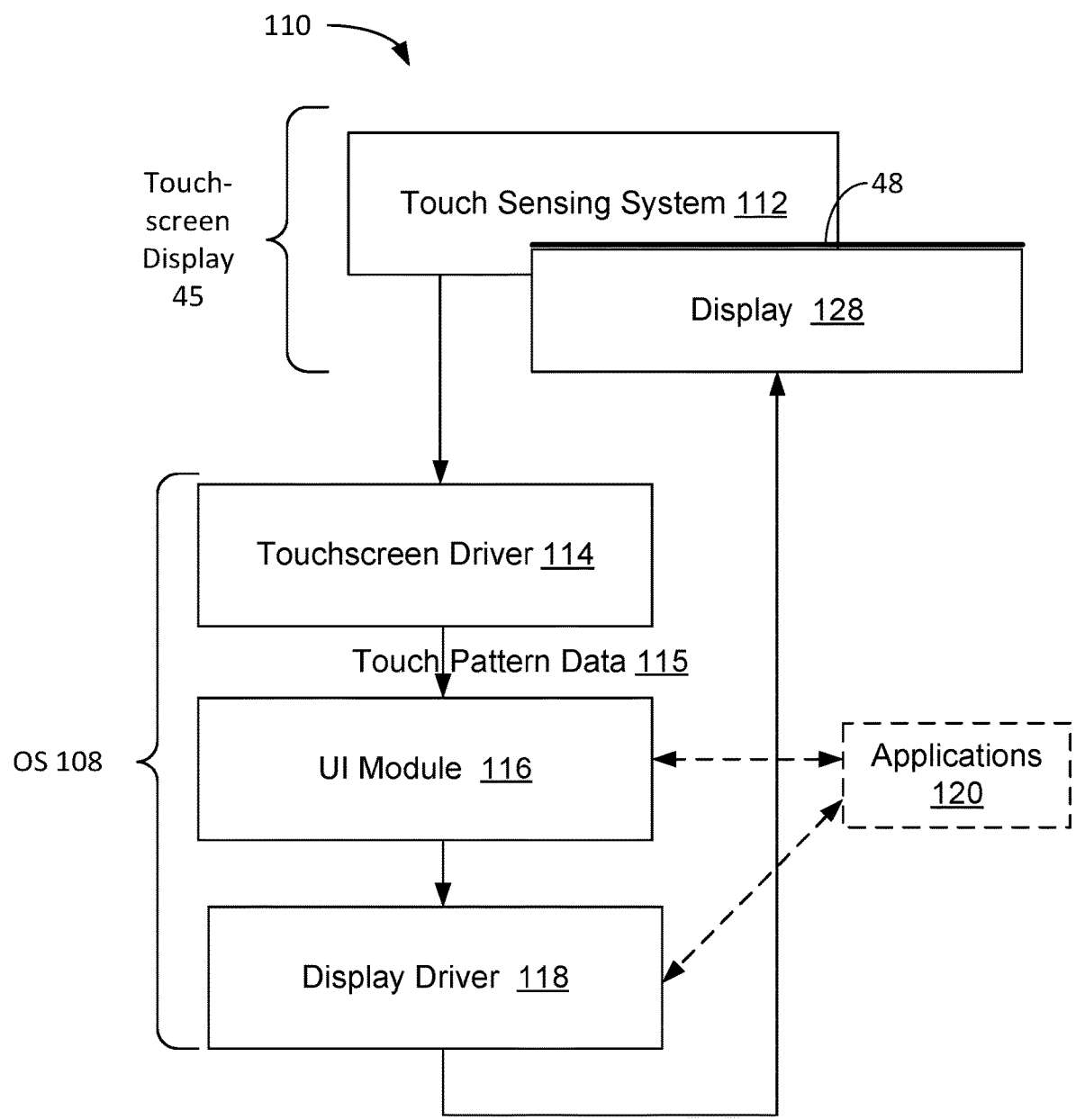
FIG. 6 is a block diagram of selected components of a touchscreen display system of an electronic device configured for use with the touch input tool described in the present disclosure.

FIG. 6 shows selected hardware and software components of a touchscreen display system 110 of the electronic device 100 for detecting and processing information about interaction of the touch elements 1020 of touch input tool 1000 with the touchscreen display 45. The hardware components of the touchscreen display system 110 include the touchscreen display 45, which includes a display 128, and a touch sensing system 112 that comprises capacitive screen 48 and components for detecting touch interactions with screen 48.

In example embodiments, touchscreen display 45 is a capacitive touchscreen display such as a surface capacitive touchscreen described above in respect of FIGS. 1A and 1B. Screen 48 is configured with an array of electrical charge storing elements that are monitored by a monitoring circuit of the touch sensing system 112. When a conductive object capable of drawing a small amount of the electrical charge operatively engages the screen 48, the touch sensing system 112 generates signals indicating the point(s) of touch contact for the touch event. In example embodiment, a point of touch contact (also referred to as a "touch contact point") corresponds to touch sensing resolution of touchscreen display refers to the smallest screen region for which a touch input can be detected in respect of.

Regarding the touch input tool 1000 of FIG. 3, placement of the shaft 1010 proximate screen 48 such that the touch elements 1020 respectively operatively engage the screen 48 at discrete touch locations corresponds to a tool touch event. Thus, a tool touch event is a combination of multiple touch element touch events, with each of the respective touch element touch events occurring at a respective discrete touch location. Depending on the size and shape of the respective touch element 1020, as well as the touch resolution of the touch screen display 45, each touch location will be the result of one or more touch contact points. Operative engagement of the screen at a touch location occurs when a conductive path is effected from the touch location to a user (via the conductive path provided by the touch element 1020 and the human contact interface 1040) that draws a sufficient amount of electrical charge to be detected by touch sensing system 112.

In some examples, the touchscreen display 45 may be a projected capacitance touchscreen display such as described above in respect of FIGS. 2A and 2B, in which case operative engagement of the screen 48 by a touch element 1020 occurs when the touch element 1020 is sufficiently close to the screen to be detected, and may not require actual physical contact.

Figure 5A:
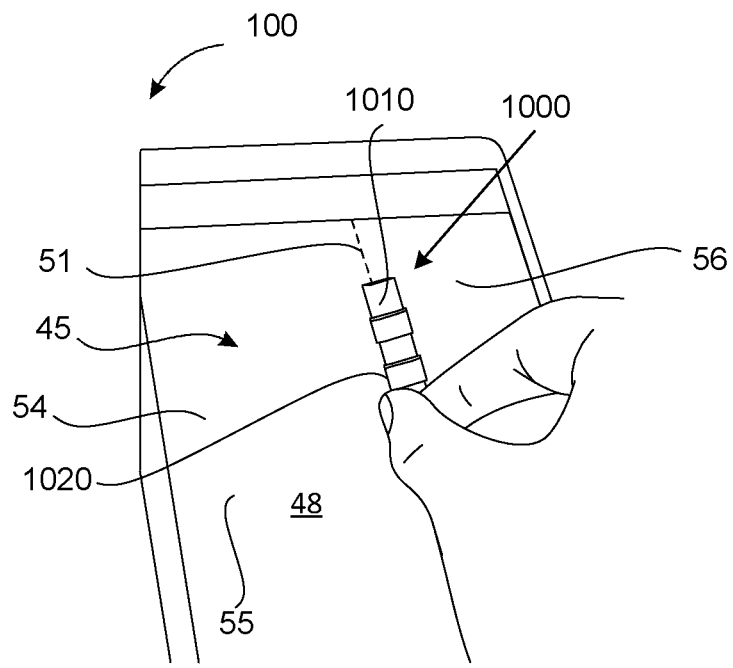
FIG. 5A depicts a touch input tool including touchscreen touch elements, the touch input tool placed on the screen of a touchscreen display of an electronic device in a generally vertical orientation.
Figure 5B:
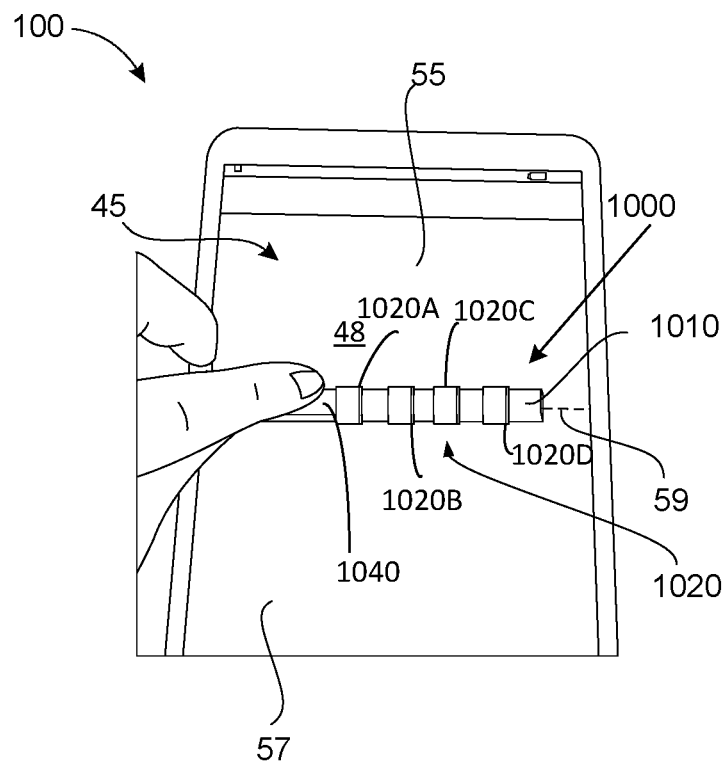
FIG. 5B depicts the touch input tool of FIG. 5A placed on the screen of the touchscreen display in a generally horizontal orientation.

Accordingly, in example embodiments, the touch sensing system 112 generates signals that specify the point(s) of contact of an object with the screen of the display 128 for a touch event. These signals are processed by software components of the touchscreen display system 110, which in an example embodiment may be part of operating system (OS) software 118 of the electronic device 100. For example, the OS software 118 can include a touchscreen driver 114 that is configured to convert the signals from touch sensing system 112 into spatial coordinate information that specifies the physical locations of touch contact point(s) for touch events on the screen of display 128. For example, in the case where touch input tool 1000 is placed on touchscreen display 45 as shown in FIGS. 5A and 5B, touchscreen driver 114 will generate touch pattern data 115 that includes a set of X and Y coordinates that each define the touch contact points that corresponds to the respective touch locations for each of touch elements 1020 of the shaft 1010 relative to a defined coordinate system of the touchscreen display 45.

In at least some examples, the touch pattern data 115 may also include an indication of the pressure applied by a touch element 1020 at a touch contact point.

In example embodiments the touch pattern data 115 generated by touchscreen driver 114 for a touch event is provided to a user interface (UI) module 116 of the OS software 118 that associates temporal information (e.g., start time) with the touch pattern data for a touch event, resulting in touch pattern data that includes spatial coordinate information for each touch element 1020 touch location along with time information. The UI module 116 is configured to determine if the touch pattern data matches a touch pattern from a set of candidate touch patterns, each of which corresponds to a respective touch input action, commonly referred to as a gesture.

In example embodiments, in addition to detecting and recognizing conventional finger and stylus tip gestures such as the Microsoft Surface™ gestures noted above, the UI module 116 is configured identify, based on touch pattern data, touch input tool gestures that match touch patterns that correspond to interactions of the shaft 1010 of touch input tool 1000 with the screen of display 128.

In example embodiments, components of the OS 118 such as the UI module 116 interact with UI components of other software programs (e.g., other applications 120) to coordinate the content that is displayed in viewing areas on the display 128.

Referring again to FIGS. 5A and 5B, generic detection of a tool shaft gesture by touchscreen display system 110 will now be described. As noted above, FIGS. 5A and 5B each illustrate examples in which the tool shaft 1010 positioned on screen 48 with the touch elements 1020 simultaneously and discretely operatively engaging screen 48.

In the examples of each of FIGS. 5A and 5B, the touch sensing system 112 generates signals indicating one or more touch contact points at the respective touch locations that correspond to each of touch elements 1020A, 1020B, 20120C and 1020D. These signals are provided to touchscreen driver 114 which generates corresponding touch pattern data for UI module 116. UI module 116 determines, based on the pattern data matching a known pattern of four axially aligned touch locations with respective inter-element spacing $d_1$, which a tool touch event corresponding to a tool shaft gesture has occurred.

Figure 7A:
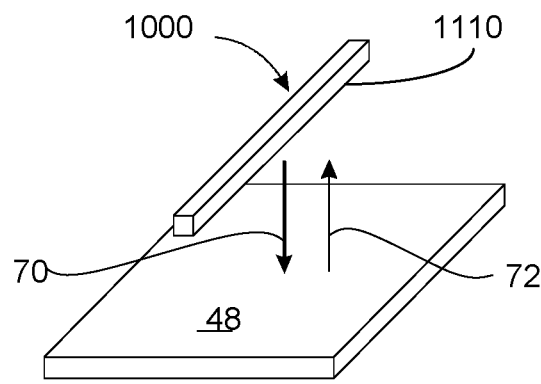
FIG. 7A depicts place and release shaft gestures by the shaft of a touch input tool in the form of a rigid rod in relation to the screen of a touchscreen display.
Figure 7B:
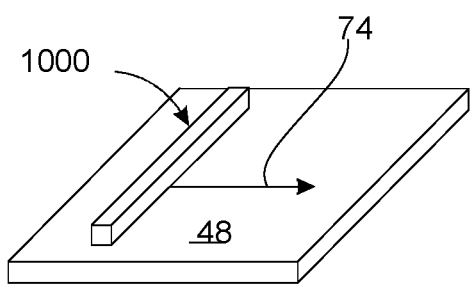
FIG. 7B depicts a sweep shaft gesture by the shaft of a touch input tool in the form of a rigid rod in relation to the screen of a touchscreen display.
Figure 7C:
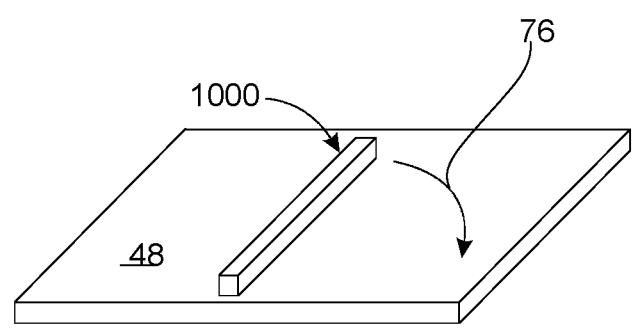
FIG. 7C depicts a rotate shaft gesture by the shaft of a touch input tool in the form of a rigid rod in relation to the screen of a touchscreen display.

Types of tool shaft gestures will be explained in greater detail reference to FIGS. 7A-7C. In each of the examples of FIG. 7A to 7C a human user is in electrical contact with human contact interface 1040.

Gesture 1: "tool shaft placement gesture". FIG. 7A depicts touch input tool 1000 positioned above the screen 48 of a touchscreen display 45. Touch input tool 1000 extends with its shaft 1010 generally parallel to screen 48 and is moved (lowered) in the direction of the arrow 70 until the touchscreen touch elements 1020 along its shaft 1110 simultaneously operatively engage the screen 48. This is classified by UI module 116 as a "tool shaft placement gesture".

Gesture 2: "tool shaft removal gesture". As indicated in FIG. 7A, subsequent to Gesture 1, the touch input tool 1000 is lifted off the screen 48 in the direction of the arrow 72 to remove the touchscreen touch elements 1020 along its shaft 1110 from operatively engaging the screen 48. This is classified by UI module 116 as a "tool shaft removal gesture".

Gesture 3: "tool shaft drag gesture". FIG. 7B depicts a tool shaft movement gesture that corresponds to the touch input tool 1000 being dragged in a linear direction perpendicular to its axis 1014 along the screen 48 in the direction of the arrow 74, with touchscreen touch elements 1020 along its shaft 1110 simultaneously operatively engaging the screen 48. The touch input tool 1000 ends up in a new location on the screen 48 at which it is parallel to but spaced from its original location on the screen 48. This is classified by UI module 116 as a "tool shaft drag gesture".

Gesture 4: "tool shaft rotation gesture". FIG. 7C depicts a tool shaft movement gesture that corresponds to the touch input tool 1000 being rotated with respect to the screen 48 in the direction of the arrow 76 with touchscreen touch elements 1020 along its shaft 1110 simultaneously operatively engaging the screen 48. The rotation of the touch input tool 1000 may be in the clockwise direction or counterclockwise direction. This is classified by UI module 116 as a "tool shaft rotation gesture".

In example embodiments, Gestures 1 to 4 indicated above are examples of possible "core" gestures. In some examples, UI module 116 is configured to detect and classify further gestures based on the occurrence of multiple core gestures within defined time periods. Some examples of these further gestures include:

Gesture 5: "tool shaft placement and removal gesture". Gesture 1 ("tool shaft placement gesture" followed by Gesture 2 ("tool shaft placement removal gesture") within a defined threshold time period (e.g., 2 s) will be classified by UI module 116 as a "tool shaft placement and removal gesture"

Gesture 6: "tool shaft drag and removal gesture". Gesture 3 ("tool shaft drag gesture") followed by Gesture 2 ("tool shaft placement removal gesture") within a defined threshold time period (e.g., 2 s) will be classified by UI module 116 as a "tool shaft drag and removal gesture".

The above list is a non-exhaustive list of possible gestures.

Figure 7D:
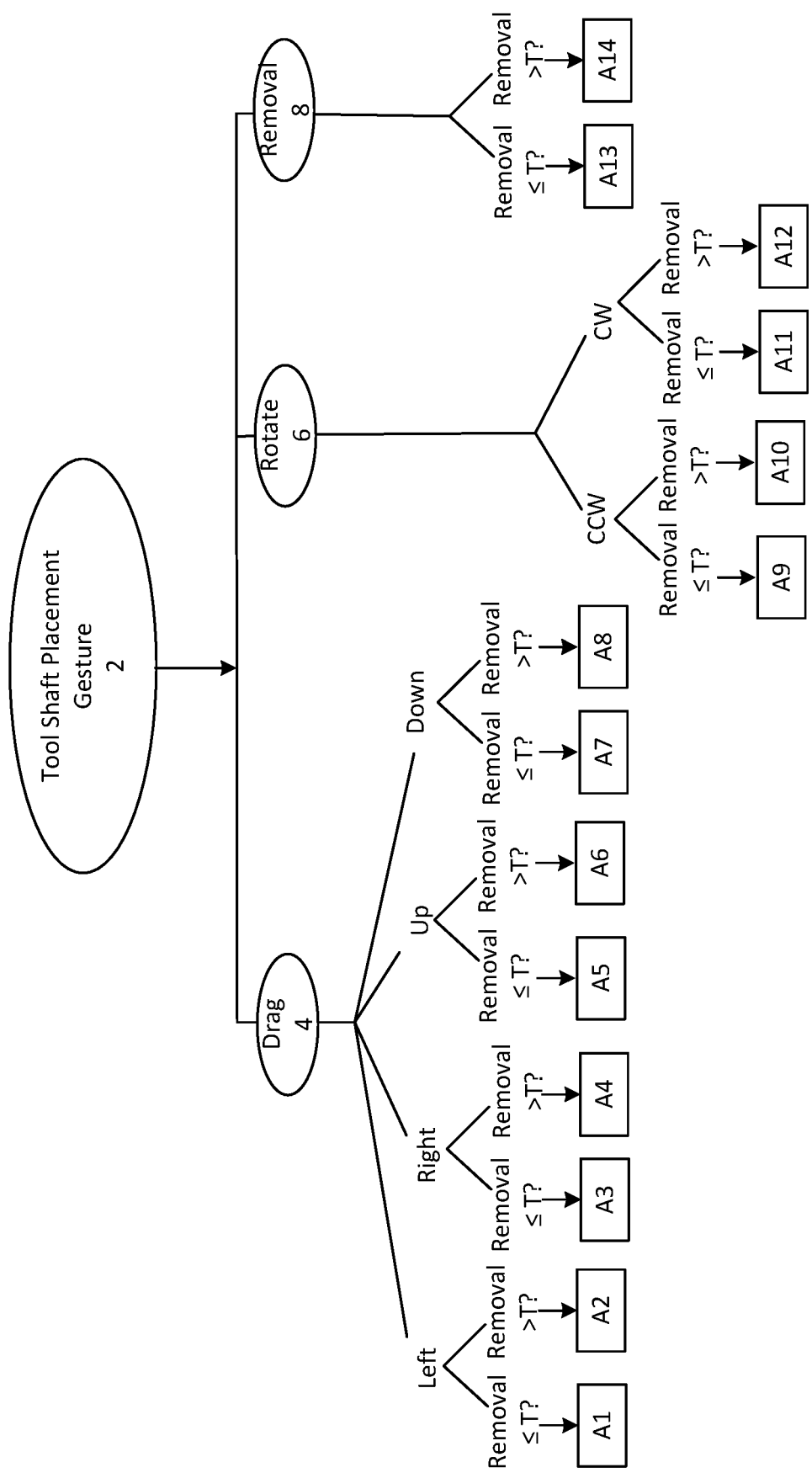
FIG. 7D illustrates a mapping of a set of actions to respective spatial and temporal combinations of tool shaft gestures.

An non-limiting example of different gesture combinations that may be detected by UI module 116 is illustrated in FIG. 7D. As indicated by item 2, a tool shaft placement gesture is detected, followed by either a tool shaft drag gesture (item 4), a tool shaft rotate gesture (item 6), or a tool shaft removal gesture (item 8). In the case of a tool shaft placement and drag gestures, a direction of the drag motion is determined relative to the screen orientation (e.g. left, right, up, down), as well as the timing of any subsequent removal option. As indicated in the FIG. 7D, in the case where a tool shaft placement-drag-removal gesture is classified in one of four movement directions and compared to a threshold time for tool removal, then eight different input possibilities can be conveyed by tool shaft placement-drag-removal gesture, each of which can cause UI module 116 to implement a respective predetermined action A1 to A8. Furthermore, the distance and location of the drag gestures can provide further input that can determine parameters of any of the actions A1 to A8.

Similarly, a set of different actions (Actions A9 to A12) could be associated with tool shaft placement-rotate-removal gestures depending on the direction of rotation (CCW—counterclockwise, CW—clockwise) and the time interval between the rotation gestures and the removal gesture. A set of different actions (Actions A13 to A14) could be associated with tool shaft placement-removal gestures depending on the time interval between the placement gesture and the removal gesture.

Furthermore, tool shaft drag and rotate gestures can be combined to define tool shaft interaction areas that have shapes that are not rectangular or circular. Additionally, as noted above, in some examples the amount of pressure exerted by a touch element 1020 can also be included with the set of attributes measured in respect of a touch location and a touch event, and used by UI module to further distinguish between touch events.

Further action inputs can be added by considering further temporal, spatial and pressure attributes of tool shaft input gestures beyond those shown in FIG. 7D, however from a practical aspect as the number of input possibilities increases, the intuitiveness of the gesture to user may decrease. In some examples, one or both of UI module 116 and application(s) 120 may be user configurable to allow a user to customize the tool shaft gesture combinations associated with different actions, thereby enabling the number and complexity of available tool shaft input gestures to be adjusted to the preferences of the user.

An apparent from the above list, touch input tool gestures can be classified based on the location, orientation and timing of tool touch events. The touch coordinate information included in the touch pattern data 115 includes information about the location, orientation and shape of an object that caused a touch event, and timing information about the touch event. That information can be used by UI module 116 to classify the touch event as a particular tool shaft gesture from a set of possible gestures, each of which has a respective predefined touch pattern.

Turning again to FIGS. 5A and 5B, in example embodiments the UI module 116 is configured to assign one or both of location and orientation information to detected tool shaft placement gestures. In this regard, FIG. 5A shows a "vertical tool shaft placement gesture" and FIG. 5B shows a "horizontal tool shaft placement gesture". In illustrated example, of FIGS. 5A and 5B, the electronic device 100 is shown in what is commonly referred to as a "portrait orientation mode" in which the shorter dimension of the rectangular touchscreen display 45 defines the width (e.g. distance from left edge to right edge) of a main viewing area 55 and the longer dimension of the rectangular touchscreen display 45 defines the height (e.g., distance from top edge to bottom edge) of the main viewing area. In example embodiments, the electronic device 100 can also operate in a "landscape orientation mode" in which the shorter dimension of the rectangular touchscreen display 45 defines the vertical height of a main viewing area 55 and the longer dimension of the rectangular touchscreen display 45 defines the horizontal width of the main viewing area 55. The dotted vertical line 41 of FIG. 5A is a vertical virtual line splitting the main viewing area of the touchscreen display 45 into a right viewing area 56 and a left viewing area 54, and represents a touch pattern corresponding to a vertical tool shaft placement gesture.

In FIG. 5A, the touch input tool 1000 is placed on the screen of touchscreen display 45 such that the shaft 1010 is substantially parallel to and generally coincides with the touch pattern axis represented by vertical virtual line 51. In the illustrated example, UI module 116 determines that the touch pattern data corresponds to a touch pattern axis 51, for a vertical tool shaft placement gesture. UI module 116 may further determine, because the touch pattern data extends along a vertical center line of the touchscreen display 45 that the tool shaft placement gesture corresponds to a "vertical tool shaft, center of screen placement gesture". In example embodiments, the UI module 116 allows for some deviation between the orientation of the touch input tool 1000 and the touch pattern represented by virtual vertical line 51. For example, the touchscreen UI module 116 may consider an angle of up to +/−20 degrees between an elongate axis of the shaft of the touch input tool 1000 and the vertical virtual line 51 to be a negligible angle. As such a touch input tool 1000 placed such that the row of touchscreen touch elements 1020 is parallel to the virtual vertical line 51, or deviates up to a threshold orientation deviation amount (e.g., 20 degrees) from the parallel, is considered to match the touch pattern represented by virtual vertical line 51, which corresponds to a vertical tool shaft placement gesture.

Similarly, the dotted horizontal line 59 of FIG. 5B is a virtual horizontal line representing the touch pattern for a horizontal tool shaft placement gesture on the main viewing area 55 of the touchscreen display 45. The placement of the touch input tool 1000 on the virtual line 59 or with an angle of deviation between the elongate axis of shaft 1010 of the touch input tool 1000 and the touch pattern represented by horizontal virtual line 59 of up to the defined orientation deviation threshold (e.g., 20 degrees) is considered to be a placement of the touch input tool 1000 in a substantially or generally horizontal orientation in a center location on the main viewing area of the touchscreen display 45.

In addition to or instead having a defined angle value tolerance for orientation deviation, the UI module 116 may also be configured to apply a distance deviation threshold in cases where the proximity of the tool shaft gesture is determined relative to a displayed landmark (e.g., a border between display areas). For example, UI module 116 may consider a shaft 1010 to be placed at or coincident with an displayed landmark if the closest touch element 1020 touch location of the shaft 1010 is within a distance deviation threshold of any part of the landmark (e.g., within a horizontal distance of up to 20% of the total screen width and a vertical distance of up to 20% of the total screen width). In some examples, the distance deviation threshold could be based on an averaging or mean over a length of the touch locations of touch elements 1020 of the shaft 1010 relative to a length of the landmark. In some examples, both a defined angle orientation deviation threshold and a distance deviation threshold may be applied in the case of determining if a tool shaft placement is located or coincides with a displayed landmark that has relevant location and orientation features (e.g., determine if touch location coordinates for a tool shaft placement gesture fall within the orientation deviation threshold from a separator and within the distance threshold of the separator).

The spatial deviation thresholds indicated above are examples. Other threshold values can be used, and in some examples may be user defined. Deviation thresholds may also be applied when classifying movement gestures—for example, in some embodiments a tool shaft drag gesture need not be perfectly linear and could be permitted to include a threshold level of on-screen rotation of the shaft 1010 during the movement. Similarly, a tool shaft rotation gesture need not be perfectly rotational and could be permitted to include a threshold level of linear on-screen drag of the shaft 1010 during the movement. In some examples, an on-screen movement that exceeded both the on-screen rotation and on-screen liner movement thresholds may be classified as a combined on-screen "tool shaft drag and rotate gesture".

In example embodiments, the touch pattern classification performed by UI module 116 may be a multiple step process, with the relative touch locations defined in the touch pattern data being used for general core gesture detection (e.g., "tool shaft placement gesture"), and then the orientation and location of touch pattern data within the overall UI display coordinate system being used to further refine the classifications (e.g., "vertical tool shaft placement gesture", "vertical tool shaft, center of screen placement gesture", or "vertical tool shaft placement that coincides with inter-display area border gesture"). As noted above in respect of Gestures 5 and 6, in some examples, changes in the touch pattern data over time is used to detect and classify movement based gestures that are based on a combination of core gestures.

In example embodiments, based on at least one of the type and location of a detected tool shaft gesture, the UI module 116 is configured to perform a corresponding action from as set of predetermined actions. For example, UI module 116 may be configured to alter a display layout of information on the display 128 by providing instructions to a display driver 118 of the OS 108. The manner in which the display layout is altered will depend on the type of the detected tool shaft gesture. In example embodiments, components of the OS 108 such as the UI module 116 interact with UI components of other software programs (e.g., other applications 120) to coordinate the content that is displayed in viewing areas on the display 128.

The example embodiment of touch input tool 1000 shown in FIG. 3 included a conductive structure 1039 having a row of equally spaced, identical touchscreen touch elements 1020. Touchscreen touch elements 1020 each have a similarly shaped and size surface that operatively engages the touchscreen display 45. However, in other examples embodiments, touch elements 1020 that have one or both of non-uniform (e.g. asymmetrical spacing) and non-uniform shapes may be included in the conductive structure 1039 of touch input tool 1000. In example embodiments, the size and shape of the individual touch elements 1020 and the touch resolution of the touchscreen display 45 are configured such that the touch contact points that are generated in respect of the touch location can be compared to a set of touch element contact patterns that each correspond to different touch location shapes and sizes, enabling the UI module 116 to distinguish between different shapes and sizes of touch elements 1020.

Figure 8A:
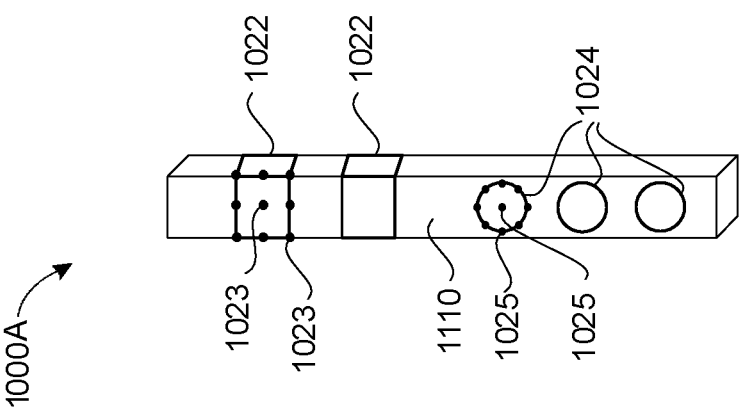
FIG. 8A depicts a touch input tool having a rigid body supporting a first plurality of square touchscreen touch elements and a second plurality of circular touchscreen touch elements, in accordance with embodiments of the present disclosure.
Figure 8B:
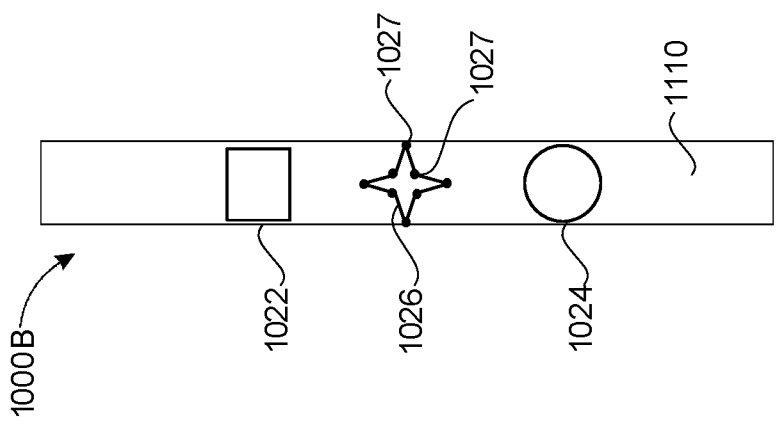
FIG. 8B depicts a touch input tool having a rigid body supporting a square touchscreen touch element, a star-shaped touchscreen touch element, and a circular touchscreen touch element, in accordance with embodiments of the present disclosure.
Figure 8C:
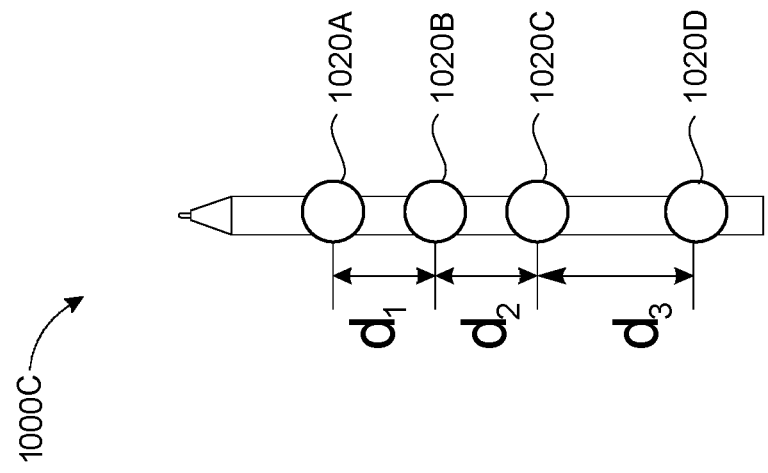
FIG. 8C depicts a touch input tool in the form of a touch input tool having rigid body supporting a plurality of touchscreen touch elements having asymmetrical spacing there between, in accordance with embodiments of the present disclosure.

In this regard, FIGS. 8A-8C provide different configurations of touch elements positioned on a shaft 1010 of respective touch input tools 1000A to 1000C, according to further example embodiments. Touch input tools 1000A to 1000C can be identical to touch input tool 1000 except for the differences in touch element shape, size and spacing as described below. In this regard, FIG. 8A depicts touch input tool 1000A having a first plurality (e.g., two) of square touchscreen touch elements 1022, and a second plurality (e.g., three) of circular touchscreen touch elements 1024 arranged in a row on a rigid body 1110, in accordance with embodiments of the present disclosure. When the touch input tool 1000A is placed on screen 48 of a touchscreen display 45 the touchscreen touch elements (1022, 1024) are detected by the touch sensing system 112. Each of the square touchscreen touch elements 1022 has a touch location that is defined by a respective plurality of touchscreen contact points 1023, and each of the round touchscreen touch elements 1025 has a touch location that is defined by a respective plurality of touchscreen contact points 1025.

The touch sensing system 112 detects the touchscreen contact points 1023, 1025 corresponding to the respective touch element touch locations of touch elements 1022 and 1024 and generates corresponding signals. The touchscreen driver 114 converts the signals from the touch sensing system 112 into touch pattern data 115 that includes spatial touch coordinate indicative of the physical location (X and Y coordinates) of the respective touchscreen contact points 1023 and 1025 on the screen of the touchscreen display 45. The UI module 116 detects touch element touch locations for the two square shaped touch elements 1022 and the three circular shaped touch elements based on the coordinates of the touchscreen contact points 1023, as well as the size and shape of the touch locations. The UI module 116 compares the size and shape of the touch locations to a dataset of touch element patterns to determine that the touch pattern data 115 includes two rectangular shaped contact elements 1022 and three circular shaped contact elements 1024 arranged in a row. Accordingly, in the case of FIG. 8A, the plurality of coordinates corresponding to touchscreen contact points 1023 for each of the touch elements 1022 match a square shape pattern and thus the UI module 116 determines that the touch pattern data of shape of the touchscreen touch element 1022 is square. Similarly, the plurality of coordinates corresponding to touchscreen contact points 1025 for each of the touch elements 1024 match a circular shape pattern and thus the UI module 116 determines that the touch pattern data of shape of the touchscreen touch element 1024 is circular. For the touch input tool 1000A of FIG. 8A, the UI module 116 can determine the location and shape of the two square touchscreen touch elements 1022 as well as the location and shape of the three circular touchscreen touch elements 1024.

In the case of FIG. 8B, touch input tool 1000B includes a square touchscreen touch element 1122, a star-shaped touchscreen touch element 1126, and a circular touchscreen touch element 1124, arranged in arrow on rigid body 1110. The shape of the touch locations of square touch element 1022 and the circular touch element 1026 are defined by contact points 1023, 1025 as described above with respect to FIG. 8A. Additionally, the star-shaped touchscreen touch element 1026 can be considered as being defined by a plurality of touchscreen contact points 1027. When the touch input tool 1000B is placed on the screen of a touchscreen display, the touchscreen contact points 1027 are detected by the touch sensing 112 and converted to coordinates by the touchscreen driver 114. The UI module 116 compares the coordinates corresponding to the touchscreen contact points 1027 as provided by the touchscreen driver 114 with a star pattern. If the plurality of coordinates corresponding to the touchscreen contact points 1027 match a star pattern, the UI module 116 determines that the shape of the touchscreen touch elements 1026 is star-shaped. For the touch input tool 1000 of FIG. 8B, the UI module 116 can determine that there are there are three touchscreen touch elements shaped like a square, star, and circle, respectively. Among other things, the different touch elements patterns can be used by UI module 116 to determine an orientation of the touch tools 1000A and 1000B. The UI module 116 is also aware of the location of the touchscreen touch elements (1022, 1024, 1026).

FIG. 8C depicts a touch input tool 1000C that is similar to touch input tool 1000 described above except that the plurality of identically shaped and sized touchscreen touch elements 1020A, 1020B, 1020C and 1020D (collectively "1020") are not evenly spaced in a row. For example, the distance between the touchscreen touch elements 1020A and 1020B is $d_1$ the distance between the touchscreen touch elements 1020B and 1020C is $d_2$, and the distance between the touchscreen touch elements 1020C and 1020D is $d_3$. In a general case, for n+1 touch elements there are n distances therebetween the last of which is denoted $d_{n-1}$. The distances $d_1, d_2, \ldots d_n$ (collectively "d") between neighboring touchscreen touch elements 120 may be equal or different. Different spacing (d) between neighboring touchscreen touch elements 1020 defines a touch pattern for the touch input tool when the touchscreen touch elements engage the screen of a touchscreen display. For example, different spacing between the touch elements 1020 may be used to determine an orientation of the touch input tool, such as touch input tool 1000C, when placed on the screen of a touchscreen. In the depicted embodiment of FIG. 8C, $d_1$ and $d_2$ are equal, while $d_3$ is larger than $d_1$ and $d_2$. In other embodiments, a combination of different shapes for the touchscreen touch elements and different spacing therebetween may be utilized.

Thus, in example embodiments the actions performed by UI module 116 or any other software component based on a tool touch pattern can be a function of the shape, size and relative spacing of the touchscreen touch elements as well as the location and orientation of the touch tool. In some examples, the respective touch locations of the different shapes of the touchscreen touch elements, such as square, circular and star-shaped touchscreen touch elements (1022, 1024, 1026) may trigger different actions by the various components of the operating system 108 and the applications running on an electronic device. For example, an application may be configured to open a context menu if it receives an indication from the UI module 116 that a star-shaped touchscreen touch element was detected in a particular region within its application window. As another example, an application window may be closed if a circular touchscreen touch element 1024 is detected within a border thereof. Accordingly, a number of modifications to the layout or content of a touchscreen display 45 may be effected by means of the differently shaped touchscreen touch elements as they engage the screen of a touchscreen display 45.

Furthermore, in some example embodiments the electronic device 100 may be configured to enable touch tools having different touch element configurations to trigger different actions using the same touch tool placement gestures.

In some embodiments, the touchscreen touch elements are not part of the touch input tool but are part of an accessory connectable to the touch input tool. For example, the conductive structure 1039 and its touchscreen touch elements 1020 may be formed on a sleeve or a cover that is slipped onto an existing pen or stylus.

In some embodiments, the touchscreen touch elements are custom made and used to uniquely identify a touch tool by forming a unique touch pattern. For example, the touchscreen touch element shapes and spacing therebetween can be uniquely defined to identify a touch tool that is associated with a unique user. In this case, the touch input tool may for example be used as a digital signature for documents. In other embodiments, the unique touch pattern can be used in place of biometrics to unlock the touchscreen display of an electronic device. In other embodiments, a unique touch pattern may be formed on touch input tool and used to unlock an electronic device, such as a smart lock.

Figure 9:
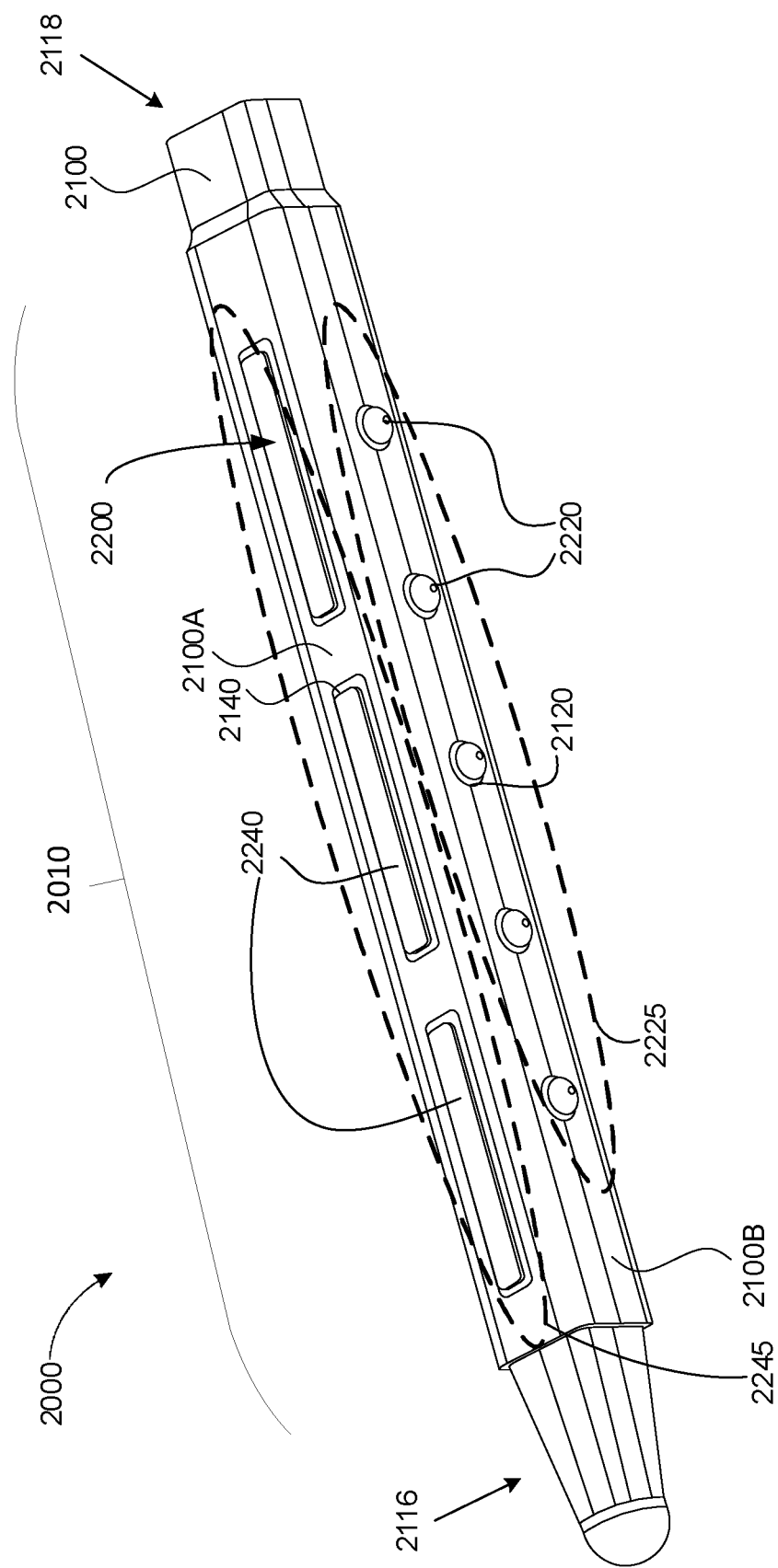
FIG. 9 is a perspective view of a touch input tool in the form of a stylus, in accordance with embodiments of the present disclosure.
Figure 10:
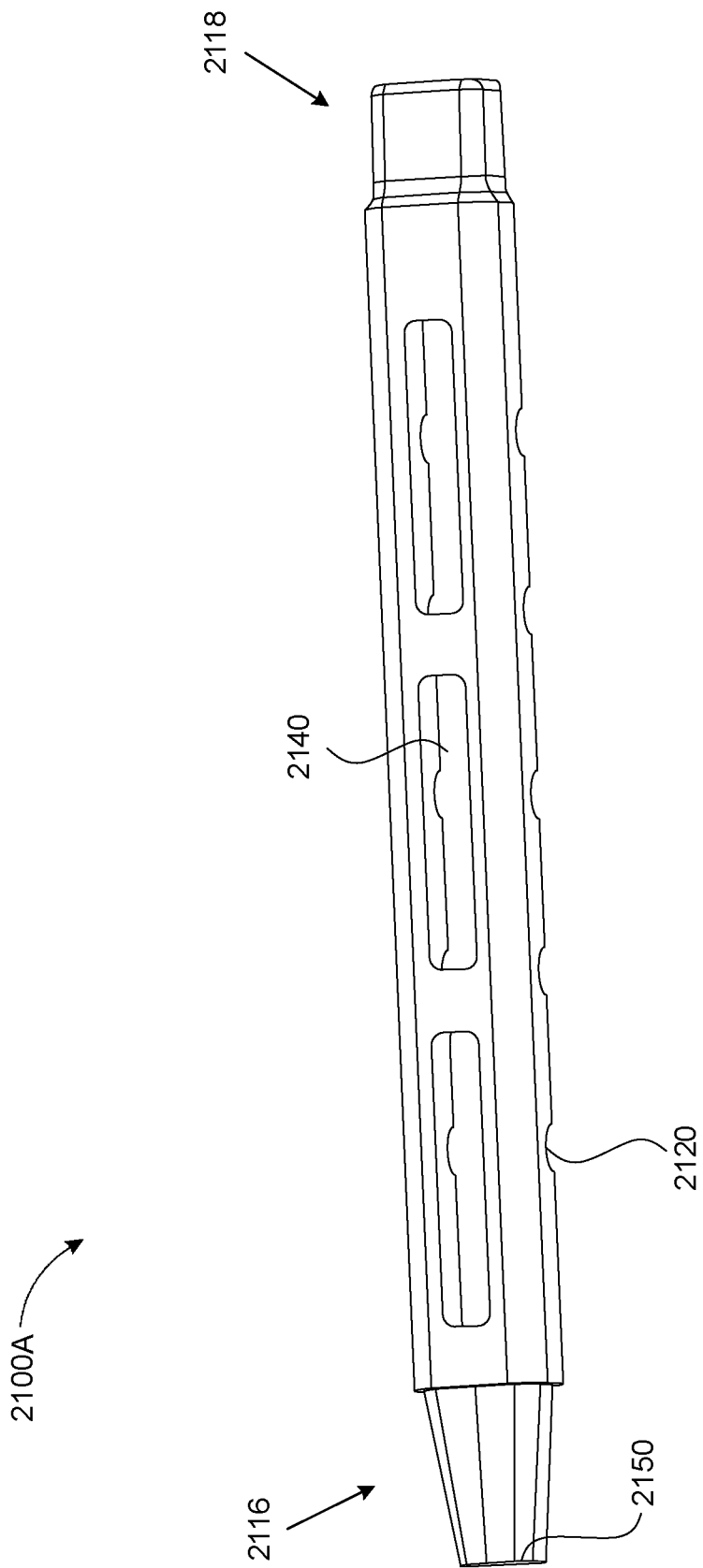
FIG. 10 is a perspective view of a top half-shell of the touch input tool of FIG. 9.
Figure 11:
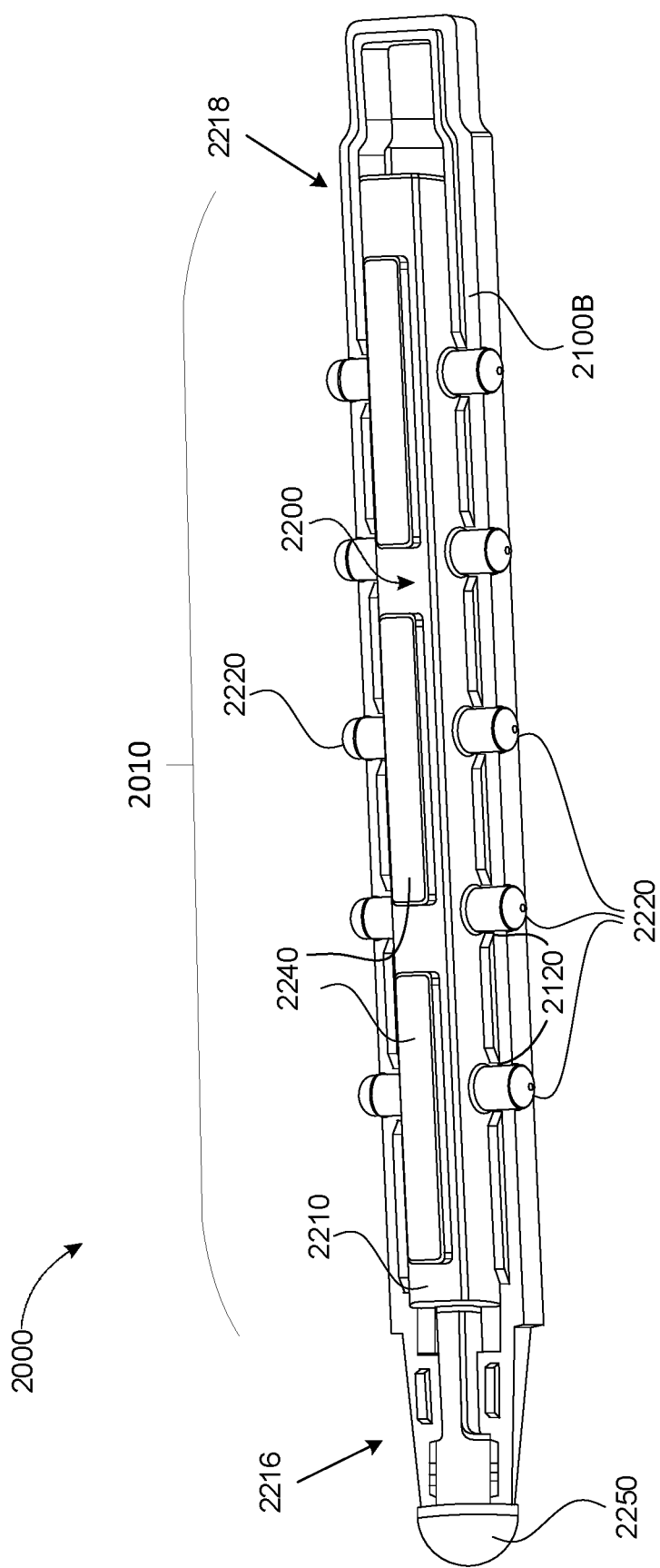
FIG. 11 is a perspective view of the touch input tool of FIG. 9 with the top half-shell being removed to fully show an inner conductive structure.

FIGS. 9 to 11 illustrate a touch input tool 2000 according to a further example embodiment. Similar to input touch tool 1000, touch tool 2000 is also a stylus-shaped passive input tool that operates by providing a conductive path from multiple discrete screen touch elements located along a shaft 2010 to a human user. However, touch input tool 2000 has an outer shell 2100 (or housing) that houses an inner conductive structure 2200. FIG. 9 shows a fully assembled touch input tool 2000; FIG. 10 shows only one half of the outer shell 2100; and FIG. 11 shows the touch input tool 2000 with half of outer shell 2100 removed. The outer shell 2100 defines an elongate interior passage extending axially between a first axial end 2116 and an opposite second axial end 2118. The outer shell 2100 is made of a non-conductive material such as a thermoset, a thermoplastic, or any other suitable non-conductive material. In one embodiment, the outer shell 2100 is comprised of axially extending two half-shells 2100A and 2100B. During assembly, the two half-shells (2100A, 2100B) are separated exposing a hollow interior of the shell 2100 sized and shaped for receiving the conductive structure 2200 therein, as best seen in FIG. 11. In some embodiments, the two half-shells (2100A, 2100B) are secured together using a thermal adhesive and/or mechanical fastener, to enclose the conductive structure 2200 inside the hollow interior passage. The conductive structure 2200 is comprised of a elongate, rigid electrically conductive body 2210 extending axially within the hollow interior passage of shall 2100 between first axial end 2216 and second axial end 2218. The body 2210 of conductive structure 2200 supports a plurality of radially extending first and second conductive elements 2220, 2240.

In the illustrated embodiment, shaft 2010 has a cuboid shape defining first and second pairs of parallel sides. As best seen in FIGS. 9 and 11, a first set 2225 (e.g., five) of the first conductive elements 2220 protrude through respective openings 2120 defined along one side of the shell 2100. The first set 2225 of the first conductive elements 2220 are arranged in a row and are spaced apart such that each of the first conductive elements 2220 can discretely operatively engage screen 48 when the shaft 2010 is placed on touchscreen display 45 with the first set 2225 of touchscreen touch elements 2220 facing the screen 48. In the illustrated example, all of the first conductive elements 2220 have an identical screen touch surface size and shape (e.g. a small circle in the illustrated Figures) and are spaced equally relative to each other. Similarly, as seen in FIG. 11, a second set of the first conductive elements 2220 protrude through respective openings 2120 defined along the opposite side of the shell 2100 than the first set 2225. In the illustrated embodiment the second set of the first conductive elements 2220 define a same touch location pattern as the first set 2225, but on the opposite side of the shaft 2010.

Furthermore, as seen in FIGS. 9 and 11, a set 2245 (e.g., three) of the second conductive elements 2240 protrude through respective openings 2140 defined along a further side of the shell 2100 that is perpendicular to the side from which the first set 2225 of first conductive elements 2240 protrude. The set 2245 of the second conductive elements 2420 are also arranged in a row and are equally spaced apart such that each of the second conductive elements 2240 can discretely operatively engage screen 48 when the shaft 2010 is placed on touchscreen display 45 with the set 2245 of touchscreen touch elements 2240 facing the screen 48. In the illustrated example, all of the second conductive elements 2240 have an identical screen touch surface size and shape (e.g. a rectangular in the illustrated Figures) and are spaced equally relative to each other. Although not shown in the drawings, a further set of the second conductive elements 2240 can also protrude through respective openings 2120 defined along the opposite side of the shell 2100 than the set 2245. In the illustrated embodiment the further set of the second conductive elements 2240 define a same touch location pattern as the set 2245, but on the opposite side of the shaft 2010.

In the case of touch tool 2000, any of the first conductive elements 2220 or second conductive elements 2240 can function as a human contact interface. Similarly, any set of the first conductive elements 2220 or second conductive elements 2240 that are all located in a row on one side of the shaft 2010 can function as a screen interface, with the individual conductive elements 2220 or 2240 functioning as respective discrete touchscreen touch elements. In some examples, shell 2100 includes a further opening 2150 at the end of outer shell 2100 permits a conductive tip 2250 to extend therethrough. Tip 225 may be connected to conductive structure 2200.

In use, in order to effect a touch tool placement gesture, a user holds the stylus 2000 by the outer shell 2100 while touching at least one of the first or second conductive elements 2220, 2240. The touch input tool 2000 is then placed with one side of its shaft 2010 on the screen of a touchscreen display 45. The respective set of first or second conductive elements 2220, 2240 are detected by touch sensing system 112 which generates corresponding signals. The touchscreen driver 114 converts the signals to touch pattern data that includes coordinates that correspond to the screen touch locations and provides the touch pattern data to the UI module 116. The UI module 116 identifies touch patterns and shaft stylus gestures as described above, which may be used to modify the content or layout of the touchscreen display. Among other things, the differently shaped conductive elements 2220, 2240 allows the UI module 116 to distinguish when different sides of the touch input tool 2000 have been placed on the touchscreen. For example, UO module 116 may cause a first action to be performed if it detects placement of a side having the set of first conductive elements 2220, and a different, second, action to be performed if it detects placement of a side having second conductive elements 2240. In some examples, patterns of differently shaped conductive elements can be provided on all four sides of the touch input tool 2000 to provide additional functionality.

In the example embodiments described above all of the screen touch elements located along the touch tool shaft have been part of the same conductive structure. According to further example embodiments, input touch tools are described that include multiple discrete electrically isolated conductive structures, each of which includes a human contact interface and one or more touchscreen touch elements. Such a configuration may enable further tool shaft gestures in addition to the ones enabled by the above embodiments. Specifically, example embodiments of the touch input tool described below enables gestures that include button interactions such as single clicking and double-clicking, as well as scroll interactions that have been traditionally accomplished by sliding a finger on a touchscreen or touchpad or rolling a trackball or mouse.

Figure 12A:
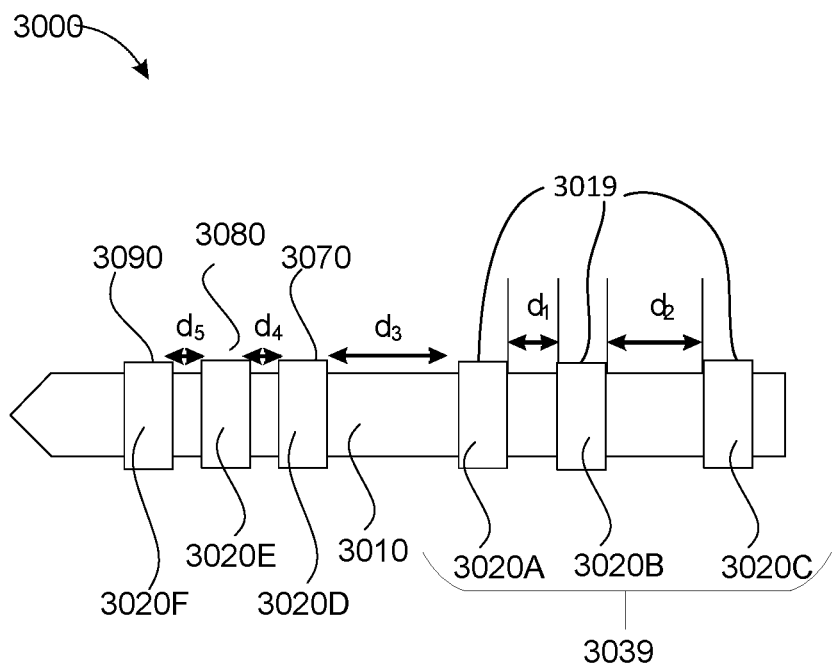
FIG. 12A is a schematic bottom plan view of a touch input tool having a first plurality of touchscreen touch elements connected via a human contact interface, and a second plurality of touchscreen touch elements, in accordance with embodiments of the present disclosure.
Figure 12B:
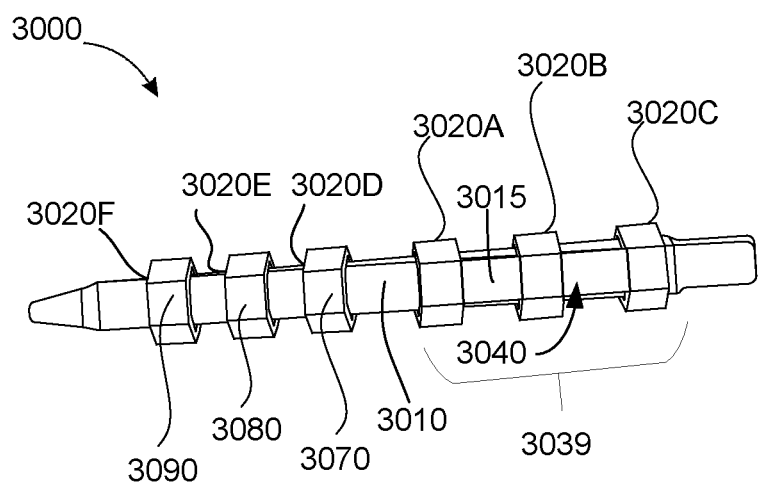
FIG. 12B is a perspective top view of the touch input tool of FIG. 12A.

With reference to FIGS. 12A and 12B, a further example of a stylus-type touch input tool 3000 is illustrated. FIG. 12A shows a screen-engaging side of the shaft 3010 of touch input tool 3000, and FIG. 12B shows an opposite side of the shaft 3010. Similar to touch input 1000, the touch input tool 3000 has a rigid body in the form of elongate shaft 3010, which supports a first conductive structure 3039. Similar to conductive structure 1039 described above, first conductive structure 3039 includes a conductive human contact interface 3040 and a screen interface that includes spaced apart touchscreen touch elements 3020A, 3020B, 3020C. In the illustrated example, the first conductive structure 3039 is formed from a plurality of conductive ring structures 3019 (e.g., 3 in the example of FIGS. 12A and 12B), that are disposed at fixed distances relative to each other along a length of shaft 3010. Conductive structure 3039 includes an elongate conductive element 3015 that extends along a length of the shaft 3010 to electrically connect the conductive ring structures 3019. Each of the conductive ring structures 3019 defines a respective one of the touchscreen touch element 3020A, 3020B, and 3020C.

The human contact interface 3040 of first conductive structure 3039 is collectively provided by the elongate strip 3015 and the regions of the conductive ring structures 3019 that are generally located along the opposite side of the shaft 3010 than the regions that define touchscreen touch elements 3020A, 3020B, 3020C. Accordingly, the first conductive structure 3039 provides: three discrete touchscreen touch elements 3020A, 3020B, and 3020C that can each operatively engage a screen 48 of a touchscreen display at a respective discrete touch location and which are all electrically coupled to a common human contact interface 3040.

In addition to first conductive structure 3039, the shaft 3010 also supports spaced apart second, third and fourth conductive structures 3070, 3080 and 3090. The plurality of conductive structures 3039, 3070, 3080, 3090 are electrically isolated from each other along the shaft 301. The second, third and fourth conductive structures 3070, 3080 and 3090 may each be formed form a conductive ring structure that has the same size and shape as conduction ring structures 3019. In this regard, each of second, third and fourth conductive structures 3070, 3080 and 3090 defines a respective touchscreen touch elements 3020D, 3020E, and 3020F that are axially arranged along shaft in a row with the touch elements 3020A, 3020B and 3020C. The conductive structures 3070, 3080, and 3090 also function as respective human contact interfaces. In the illustrated example, spacing between the respective touch elements is fixed as follows: touch element 3020A and 3020B spacing is "$d_1$"; touch elements 3020B and 3020C spacing is "$d_2$"; touch element 3020A and 3020D spacing is "$d_3$"; touch element 3020D and 3020E spacing is "$d_4$"; and touch element 3020E and 3020F spacing is "$d_5$".

In example embodiments, the inter-touch element spacing is selected to enable unique touch patterns to be detected by UI module 116 for each possible touch event combination of the conductive structures 3039, 3070, 3080, 3090. A touch event for a conductive structure 3039, 3070, 3080, 3090 occurs when the touch element(s) of the conductive structure operatively engage the screen 48 while a human user is also in electrical contact with the respective conductive structure 3039, 3070, 3080, 3090. In some examples, the touchscreen touch elements 3020A, 3020B, and 3020C of the first conductive element 3039 are spaced apart by different distances, i.e., $d_1 \neq d_2$. In some examples, $d_3 \neq d_1 \neq d_2 \neq d_4$, and $d_4 = d_5$. In some examples, the difference in spacing between the touchscreen touch elements of the first conductive element 3039 enables the UI module 116 to determine the orientation and direction of the touch input tool 3000 when it is placed on a screen of a touchscreen display 45.

Figure 13A:
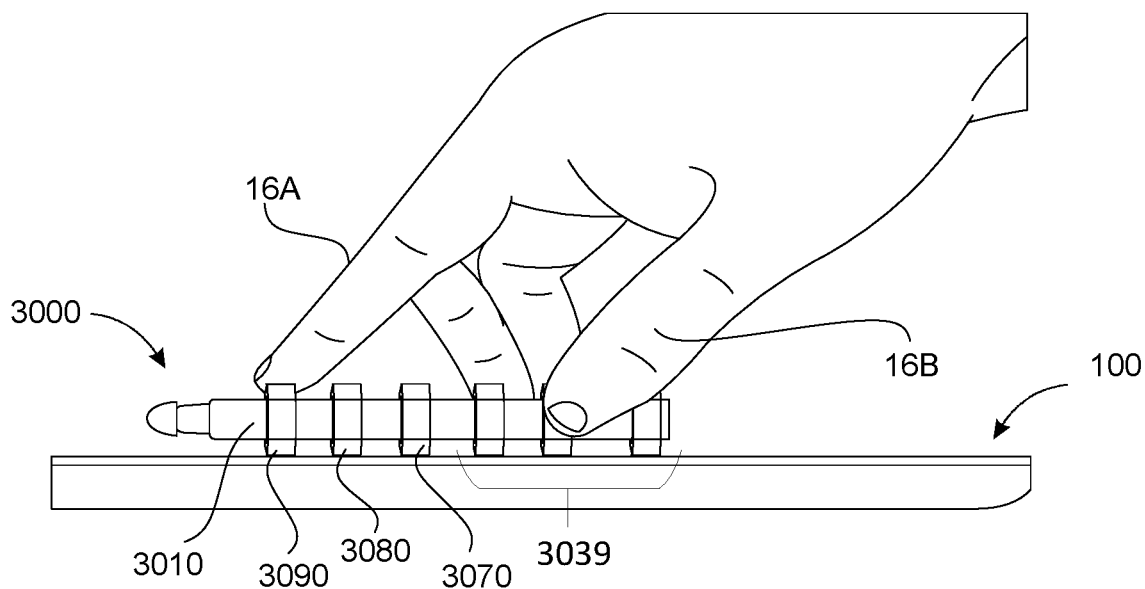
FIGS. 13A and 13B depict a tool shaft click gesture carried out using a touch input tool placed on a screen of a touchscreen display of an electronic device, in accordance with embodiments of the present disclosure.

The use of the touch input tool 3000 of FIGS. 12A and 12B is described with reference to FIGS. 13A-13B, FIG. 14, and FIGS. 15A-15B. First with reference to FIGS. 13A and 13B, a single button click action or a "tool shaft click gesture" is described. In FIG. 13A, the touch input tool 3000 is placed on a screen 48 of a touchscreen display 45 of an electronic device 100. In FIG. 13A, first conductive structure 3039 is touched by a user finger 16B. The touch sensing system 112 senses a touch event that includes touch element touch events for each of the touchscreen touch elements 3020A, 302B, 3020C of the first conductive structure 3039 and generates corresponding signals. Based on the signals, the touchscreen driver 114 generates touch pattern data for the touch event that includes coordinates that specify the touch location of each of the touch elements 3020A, 302B, 3020C. By comparing the touch pattern data to a dataset of touch patterns, the UI module 116 can determine that the shaft 3010 of the touch input tool 3000 is placed on the display and also determine the orientation and direction thereof based on the different spacing between the elements 3020A, 3020B and 3020C as discussed. This represents a determination by the UI module 116 of a tool shaft placement gesture.

In example embodiments, the UI module 116 is configured to interpret user contact with one of the further the conductive structures 3070, 3080, 3090 while conductive structure 3039 operatively engages screen 48 as a "tool shaft click" gesture. For example, in FIG. 13A, while the first conductive structure 3039 is touched by a user finger 16B, a second user finger 16A subsequently contacts and one of the conductive structures, namely fourth conductive structure 3090. As discussed above, the conductive structures 3070, 3080, and 3090 and their respective touch elements 3020D, 3020E and 3020F are electrically isolated from each other and from first conductive element 3039 along shaft 3010. Accordingly, in the example of FIG. 13A, the touch sensing system 112 detects a further touch event corresponding to the touch element of 3020F of fourth conductive structure 3090 and generates a corresponding signal. The touchscreen driver 114 processes the signal and generates touch pattern data that includes coordinates indicating the location of the touch element of 3020F of fourth conductive structure 3090. This further touch pattern data is provided to the UI module 116.

Figure 13B:
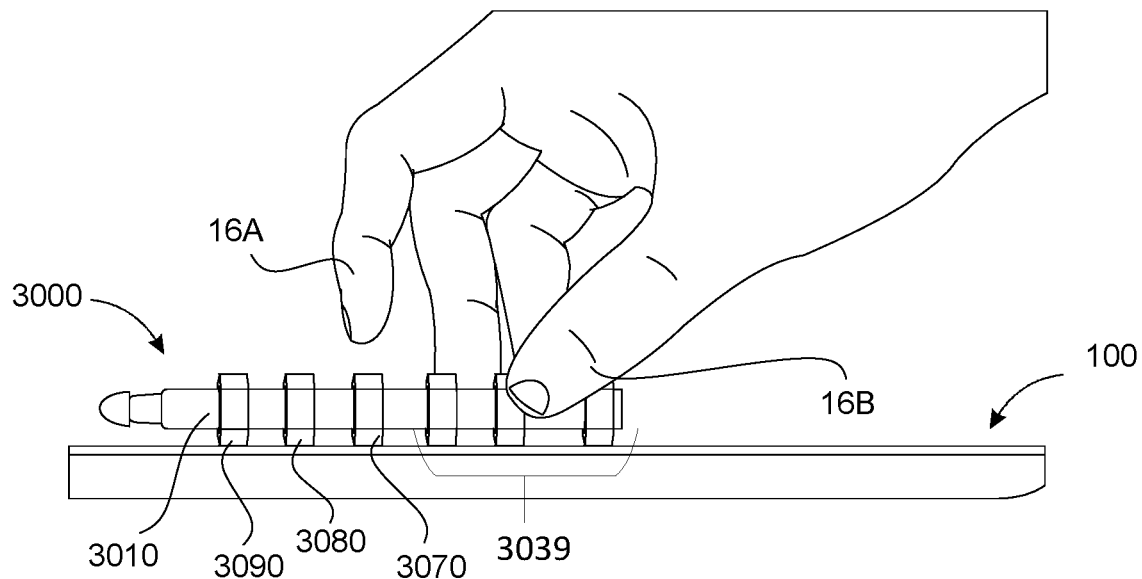

Based on the earlier touch pattern data generated in respect of first conductive structure 3039, the UI module 116 is aware of the orientation (including direction) of the touch input tool 3000, and thus the UI module 116 can determine based on the further touch pattern data and pre-defined knowledge of the configuration of the touch input tool 3000 that the fourth conductive structure 3090 has been touched by the user. The UI module 116 determines that either a tool shaft click gesture or a tool shaft click and hold gesture has been performed. In some examples, the UI module 116 may start a timer and wait for the earlier of two events: the expiration of the timer, or the removal of the human contact with the touchscreen fourth conductive structure 3090. In FIG. 13B, the touch event corresponding to touchscreen fourth conductive structure 3090 is terminated by lifting (removal) of the user finger 16A from the fourth conductive structure 3090. As before, this removal touch event is detected by the touch sensing system 112, and the coordinates of the conductive structure 3090 are provided to the UI module 116. If the removal touch event is detected by the UI module 116 before the expiration of the timer, the UI module 116 concludes that there has been a tool shaft click gesture involving the touchscreen second conductive structure 3090. If the removal touch event is not detected with the defined timer period, the UI module 116 concludes that a tool shaft click and hold gesture involving the conductive structure 3090.

Touch events resulting from the different touchscreen touch elements 3020D, 3020E and 3020F of the conductive elements 3070, 3080 and 3090, respectively, may result in different functions and actions being performed at the electronic device 100 based on the timing and order of such touch events relative to each other and to touch events corresponding to the first conductive structure 3039. For example, a touch events corresponding to the fourth conductive structure 3090 may be interpreted as a left mouse click of a conventional mouse. A screen touch event corresponding to user contact with second conductive structure 3070 may be interpreted as a right mouse click. A screen touch event corresponding to user contact with third conductive structure 3080 may be interpreted as a mouse track wheel event or the middle button of a 3-button mouse. The UI module 116 may provide an indication of a tool shaft click gesture to the operating system 108 or to an application. The tool shaft click gesture indication may contain an identifier for the touchscreen touch element that was actuated. Based on the element the operating system or application may modify the content or layout rendered on of one or more viewing areas or application windows accordingly.

As indicated above in respect of FIG. 13A, when a "tool shaft click gesture" continues for over a threshold period it will be classified as a "tool shaft click and hold gesture" by UI module 116. The tool shaft click and hold gesture may be used by some applications for special operations such as selecting text, or in gaming applications. In some examples it may be combined with tool shaft gestures described above, such as a tool shaft drag gesture, to highlight displayed regions or take other actions.

Figure 14:
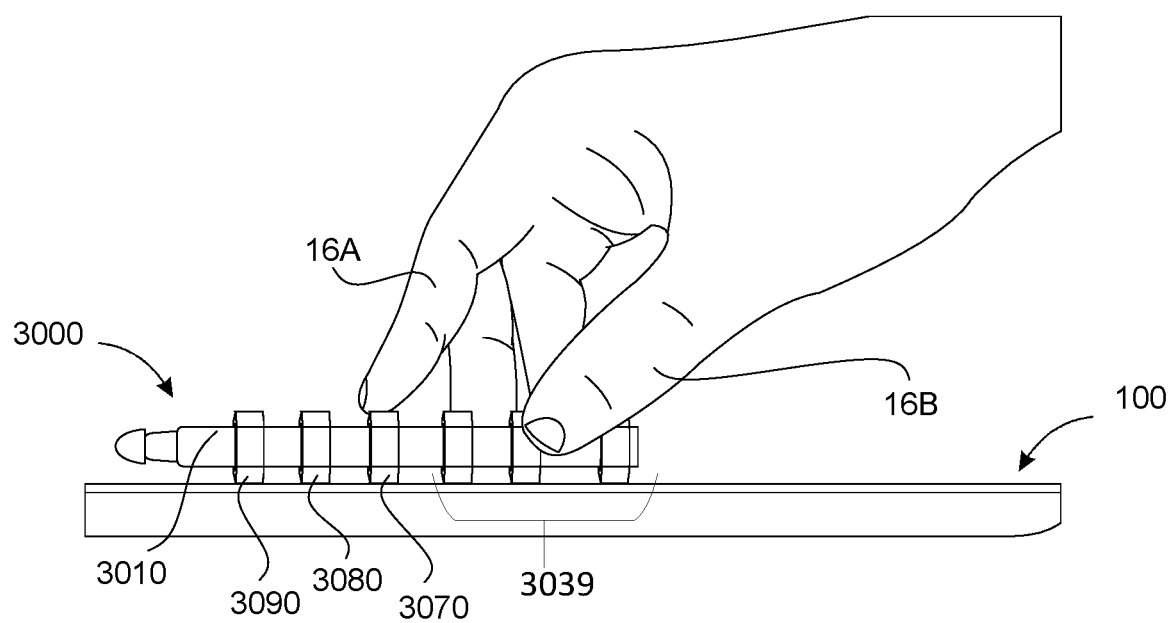
FIG. 14 depicts a tool shaft slide gesture carried out using a touch input tool placed on a screen of a touchscreen display of an electronic device, in accordance with embodiments of the present disclosure.

A further tool shaft gesture using touch input tool 3000 will now be described with reference to FIGS. 13A and 14. As noted above, FIG. 13A illustrates a "tool shaft clock gesture" in which a user touches the fourth conductive structure 3090 to generate a touch event at touch element 3020F during a time that the user is also touching the first conductive element 3039 (which generates a touch event comprising the three touch elements 3020A, 3020B and 3020C). As discussed above, timing information for the touch events is tracked by the UI module 116 (e.g., start time, duration and end time for each touch event. In example embodiments, the UI module is configured to detect touch events that correspond to a user sliding finger 16A from the fourth conductive structure 3090 (as shown in FIG. 13A), to the third conductive structure 3080, to second conductive structure 3070 (as shown in FIG. 14). In such a case, UI module 116 will detect a touch event at a touch location corresponding to fourth conductive structure 3090, followed by touch event at a touch location corresponding to the third conductive structure 3080, followed by touch event at a touch location corresponding to second conductive structure 3070. UI module 116 is configured to determine that, when these three touch events occur within a defined time duration, which a "tool shaft slide gesture" in a first axial direction has occurred. A tool shaft slide gesture can also occur in the opposite, when the finger 16A slides from the second conductive structure 3070, to the third conductive structure 3080, to fourth conductive structure 3090.

In some examples, detection of a tool shaft slide gesture may cause the operating system 108 (or a further applications) to perform an action that may also be dependent on the location, orientation and direction of the tool shaft slide gesture and the content rendered on the display 128. For example, a tool shaft slide gesture may be used to manipulate a slider control such as a volume control in a multimedia application. In other applications, a tool shaft slide gesture may be used to scroll the contents of a viewing area or an application window.

Accordingly, in addition the tool shaft gestures noted above be in respect of touch input tool 1000, in example embodiments the touch input tool 300o may also allow the following gestures to also be supported.

Gesture 7: "tool shaft click gesture". Gesture 1 ("tool shaft placement gesture") caused by a first conductive structure located on tool shaft 3010 (e.g., first conductive structure 3039) followed by a further touch event caused by a further conductive structure (e.g. structure 3070, 3080 or 3090). In example embodiments, the further touch event must terminate within a defined time duration (e.g., indicating user has removed finger from the further conductive structure).

Gesture 8: "tool shaft click and hold gesture". Gesture 1 ("tool shaft placement gesture") caused by a first conductive structure located on tool shaft 3010 (e.g., first conductive structure 3039) followed by a further touch event caused by a further conductive structure (e.g. structure 3070, 3080 or 3090), where the further exceeds a defined time duration (e.g., indicating user has maintained finger on the further conductive structure).

Gesture 9: "tool shaft click and hold and drag gesture". Gesture 1 ("tool shaft placement gesture"), followed by Gesture 8 ("tool shaft click and hold gesture"), followed by Gesture 3 ("tool shaft drag gesture").

Gesture 10: "tool shaft click and hold and rotate gesture". Gesture 1 ("tool shaft placement gesture"), followed by Gesture 8 ("tool shaft click and hold gesture"), followed by Gesture 4: ("tool shaft rotate gesture").

Gesture 10: "tool shaft slide gesture". Gesture 1 ("tool shaft placement gesture"), followed by successive touch events at a plurality of further conductive structures 3070, 3080 or 3090 within a defined time threshold.

Figure 15:
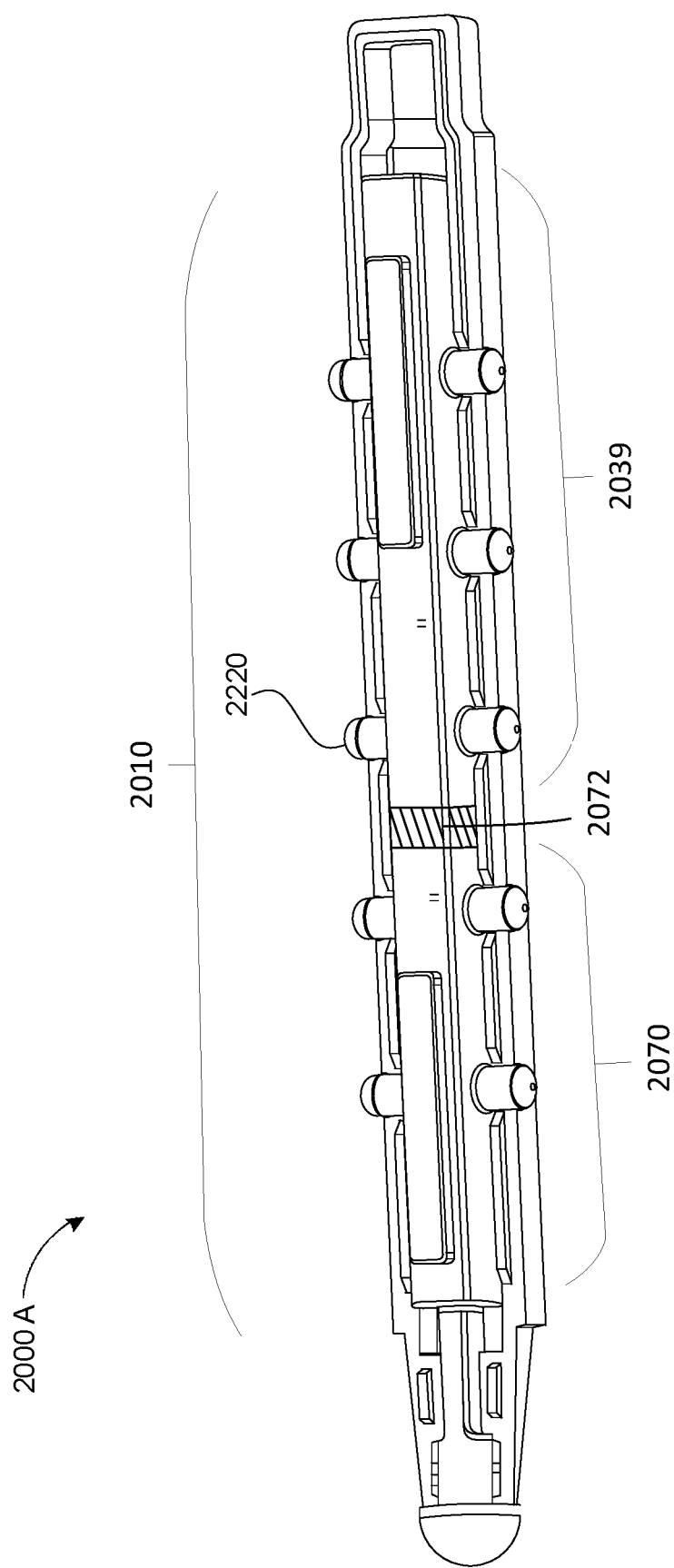
FIG. 15 is a perspective, sectional view of a further touch input tool in accordance with embodiments of the present disclosure.

Touch input tools with multiple discrete conductive structures can have a number of configurations other than as illustrated in the example input touch tool 3000 of FIGS. 12A and 12B. By way of example, the structure of input touch tool 2000 as described above in respect of FIGS. 9 to 11 could be modified to include multiple discrete conductive structures that each include one or more respective touch elements. In this regard, FIG. 15 illustrates a further input touch tool 2000A that is similar to input touch tool 2000 with the exception that rather than include a single conductive structure 2200 housed within shell 2100, the input touch tool 2000A includes two discrete conductive structures 2039 and 2070 that each define respective touch screen touch elements. The two discrete conductive structures 2039 and 2070 are hosed within the non-conductive shell and electrically isolated from each other by a non-conductive structure 2072.

Figure 16:
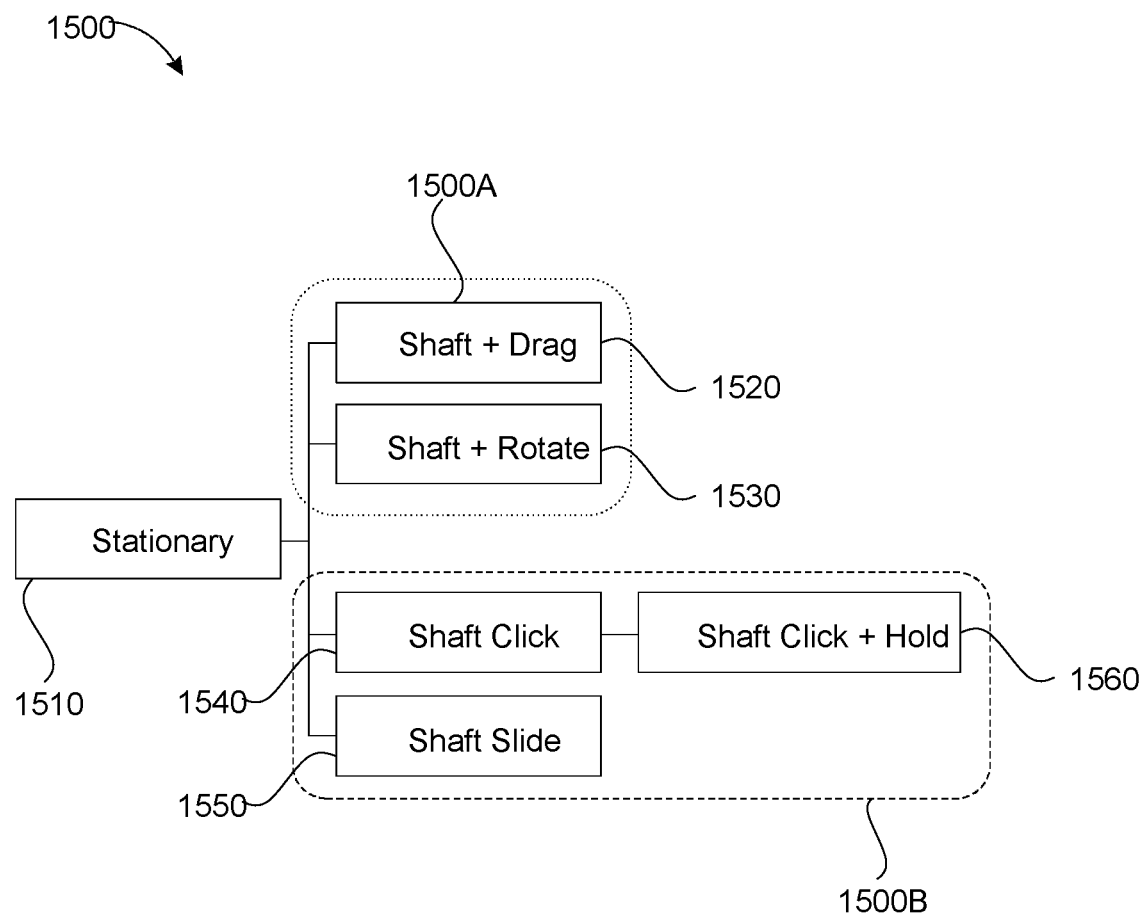
FIG. 16 is a state diagram depicting the various tool shaft gestures that may be carried out by a touch input tool from a stationary position on the screen of a touchscreen display, in accordance with embodiments of the present disclosure.

FIG. 16 is a state diagram 1500 which summarizes at least some of the tool shaft gestures between the touch input tool and a touchscreen display, as described in this disclosure. At 1510 a tool shaft placement gesture positions a touch input tool on the screen of a touchscreen display in a stationery mode while the user maintains contact with a conductive structure (e.g., 1039 or 3039) that includes a first plurality of touchscreen touch elements. A plurality of tool shaft movement gestures are grouped together in the group 1500A. A shaft of the touch input tool can be dragged or slid along the screen, in what is known as the tool shaft drag gesture at 1520. Alternatively, the shaft of the tit can be rotated at 1530, in what has been described as a tool shaft rotate gesture. A plurality of tool shaft click/slide gestures are grouped together in the group 1500B. From a stationary position 1510, while the user is touching the conductive structure (e.g., 3039) that includes the first plurality of touchscreen touch elements, a shaft click gesture (represented at 1540) occurs when one of the further conductive structures (e.g., 3020D, 3020E, 3020F) having a respective touchscreen touch elements is touched and released as described above. If one of the further conductive structures is touched and held, then at 1560 a tool shaft click and hold gesture is detected. In case where the further conductive structures are successively touched by a finger (e.g. finger is slid along the further conductive structures) a touchscreen touch elements to at least a second touchscreen touch element, tool shaft slide gesture is detected at 1550.

The touch input tool described herein is passive and does not require a power source such as a battery. In at least some examples, the touch input tool provides a low-cost solution for augmenting the shaft of a capacitive stylus with interactive capabilities. Applying conductive materials in a specific pattern on the stylus shaft allows the shaft to be detected when placed on a capacitive touchscreen. In some examples, on-stylus interactions, such as button clicks or swiping, are enabled which are not possible on a typical passive capacitive stylus. Shaft-to-tablet interactions, such as rotating and dragging the stylus are also enabled.

Figure 17:
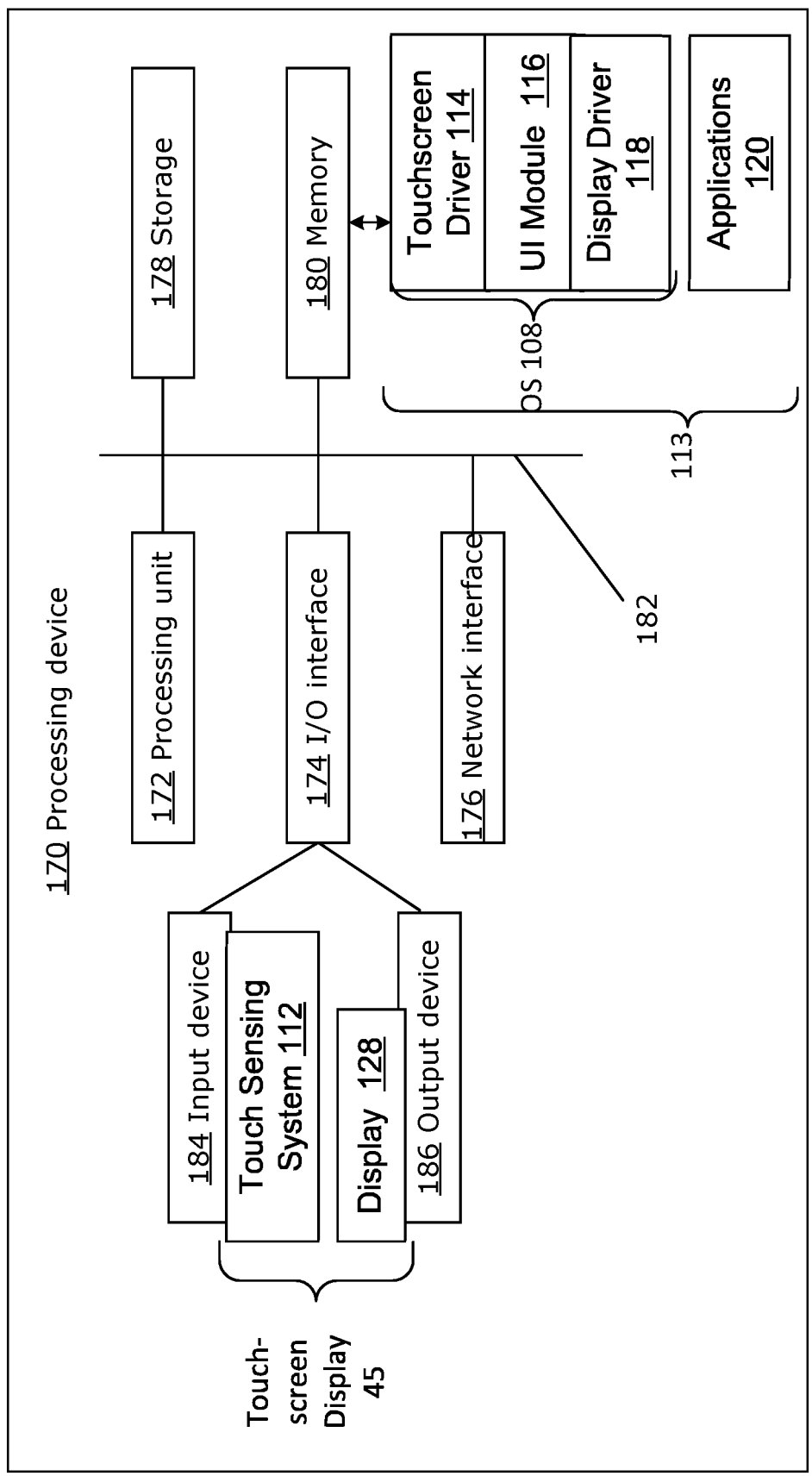
FIG. 17 is a block diagram representative of an electronic device configured for use with the touch input tool described in the present disclosure.

FIG. 17 is a block diagram of an example simplified processing device 170, which may be used to implement the electronic device 100. The processing device 170 may be used to execute machine readable instructions, in order to implement methods and examples described herein. Other processing units suitable for implementing embodiments described in the present disclosure may be used, which may include components different from those discussed below. Although FIG. 17 shows a single instance of each component, there may be multiple instances of each component in the processing device 170.

The processing device 170 may include one or more processing units 172, such as a processor, a microprocessor, an application-specific integrated circuit (ASIC), a field-programmable gate array (FPGA), a dedicated logic circuitry, a tensor processing unit, a neural processing unit, a hardware accelerator, or combinations thereof. The processing device 170 may also include one or more input/output (I/O) interfaces 174, which may enable interfacing with one or more appropriate input devices 184 and/or output devices 186. The processing device 170 may include one or more network interfaces 176 for wired or wireless communication with a network (e.g., an intranet, the Internet, a P2P network, a WAN and/or a LAN) or other node. The network interfaces 176 may include wired links (e.g., Ethernet cable) and/or wireless links (e.g., one or more antennas) for intra-network and/or inter-network communications.

The processing device 170 may also include one or more storage units 178, which may include a mass storage unit such as a solid state drive, a hard disk drive, a magnetic disk drive and/or an optical disk drive. The processing device 170 may include one or more memories 180, which may include a volatile or non-volatile memory (e.g., a flash memory, a random access memory (RAM), and/or a read-only memory (ROM)). The non-transitory memory(ies) 180 and/or storage units 178 may store software programs 113 that include instructions for execution by the processing unit(s) 172, such as to carry out examples described in the present disclosure. Software programs 113 may include software instructions for implementing operating system 108 (which as noted above can include touchscreen driver 114, UI module 116 and display driver 118, among other OS components) and other applications/functions 120. In some other examples, one or more data sets and/or modules may be provided by an external memory (e.g., an external drive in wired or wireless communication with the processing device 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In some examples touch patterns that correspond to the touch input gestures described above may be stored in storage unit 178 and/or memory 180.

There may be a bus 182 providing communication among components of the processing device 170, including the processing units(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

In FIG. 17, the input device(s) 184 and output devices 186 include touchscreen display 45, which performs both input and output functions.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A touch input tool for interacting with a capacitive touchscreen display, the touch input tool comprising;
    a plurality of spaced apart conductive touchscreen touch elements arranged to simultaneously operatively engage a screen of the touchscreen display at a corresponding plurality of discrete respective touch locations;
    a first conductive structure that includes a human contact interface and the touchscreen touch elements, the human contact interface and touchscreen touch elements being configured so that a conductive path is provided from each of the touchscreen touch elements to the human contact interface enabling the touchscreen touch elements to simultaneously operatively engage the screen at the respective touch locations when the human contact interface is in conductive contact with a human and the touchscreen touch elements touch the screen; and
    a second conductive structure that is electrically isolated from the first conductive structure and includes a respective touch screen touch element to operatively engage the screen at a respective touch location and a respective human contact interface that is arranged relative to the human contact interface of the first conductive structure to enable both of the human contact interfaces to be simultaneously contacted by a same hand of a user.

2. The touch input tool of claim 1 wherein the touch input tool is a stylus and the touchscreen touch elements are arranged along a shaft of the stylus.

3. The touch input tool of claim 1 wherein the first conductive structure includes three of the touchscreen touch elements arranged to provide a touchscreen touch pattern that indicates a direction of the touch input tool with respect to the touchscreen display when the three touchscreen touch elements operatively engage the screen.

4. The touch input tool of claim 3 wherein the three touchscreen touch elements are arranged along an axis of the touch input tool, a middle of the three touchscreen touch elements being located asymmetrically between the other two of the three touchscreen touch elements.

5. The touch input tool of claim 1 wherein at least one of the touchscreen touch elements is configured to provide a different touch element pattern than at least one other of the touchscreen touch elements.

6. The touch input tool of claim 1 comprising a third conductive structure that is electrically isolated from the first conductive structure and the second conductive structure, the third conductive structure including a respective touch screen touch element to operatively engage the screen at a respective touch location and a respective human contact interface that is arranged relative to the human contact interface of the first conductive structure to enable both of the human contact interfaces to be simultaneously contacted by a same hand of a user.

7. The touch input tool of claim 6 wherein the touch screen elements of the first second and third conductive structures are arranged along a shaft of the touch input tool to simultaneously contact the screen when the touch input tool is placed on the screen, and the human contact interfaces are arranged along the shaft.

8. The touch input tool of claim 1 wherein the spaced apart conductive touchscreen touch elements are defined by respective conductive structures that extend in a radial direction from a shaft of the touch input tool to provide respective protruding contact surfaces for engaging the screen of the touchscreen display at the corresponding plurality of discrete respective touch locations.

9. The touch input tool of claim 1 comprising a housing defining an axially extending internal passage and a conductive body extending within the internal passage, the plurality of spaced apart conductive touchscreen touch elements extending from the conductive body through respective openings defined along a side of the housing.

10. The touch input tool of claim 9 wherein the touch input tool includes a conductive touch tip at an end of the conductive body, the touch tip being electrically connected to the conductive body.

11. The touch input tool of claim 9 including a further plurality of spaced apart conductive touchscreen touch elements extending from the conductive body through respective openings defined along a further side of the housing, the further plurality of spaced apart conductive touchscreen touch elements being arranged to simultaneously operatively engage the screen of the touchscreen display, the further plurality of spaced apart conductive touchscreen touch elements having a different pattern than the plurality of touchscreen elements.

12. The touch input tool of claim 1 wherein the touch tool includes only passive electrical components for effecting operative engagement of the screen by the touchscreen touch elements.

13. A system comprising the touch input tool of claim 1 and an electronic device comprising a touchscreen display, the electronic device being configured to sense a touch event on the touchscreen display and determine if the touch event matches a touch input tool gesture pattern that corresponds to the plurality of touchscreen touch elements simultaneously operatively engaging the touchscreen display.

14. The system of claim 13 wherein the electronic device is configured to determine that a button click input has occurred if a further touch event on the touchscreen display matches a touch input tool gesture pattern that corresponds to the touchscreen touch element of the second conductive structure operatively engaging the touchscreen display.

\* \* \* \* \*